(12) United States Patent
Zhu

(10) Patent No.: US 11,425,538 B2
(45) Date of Patent: Aug. 23, 2022

(54) EVENT MONITORING METHOD AND APPARATUS

(71) Applicant: HUAWEI TECHNOLOGIES CO., LTD., Guangdong (CN)

(72) Inventor: Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/066,914

(22) Filed: Oct. 9, 2020

(65) Prior Publication Data

US 2021/0029517 A1 Jan. 28, 2021

Related U.S. Application Data

(63) Continuation of application No. PCT/CN2019/081696, filed on Apr. 8, 2019.

(30) Foreign Application Priority Data

Apr. 9, 2018 (CN) .......................... 201810312936.6
Apr. 18, 2018 (CN) .......................... 201810349848.3

(51) Int. Cl.
*H04W 24/10* (2009.01)
*H04W 4/08* (2009.01)
(Continued)

(52) U.S. Cl.
CPC ............. *H04W 4/08* (2013.01); *H04W 8/186* (2013.01); *H04W 24/10* (2013.01); *H04W 68/005* (2013.01)

(58) Field of Classification Search
CPC ....... H04W 4/08; H04W 8/186; H04W 24/10; H04W 68/005; H04W 24/02;
(Continued)

(56) References Cited

U.S. PATENT DOCUMENTS

2016/0007138 A1* 1/2016 Palanisamy ............. H04W 4/50
455/41.2
2019/0362314 A1* 11/2019 Chen ....................... H04L 67/18

FOREIGN PATENT DOCUMENTS

CN  105657686 A  6/2016
CN  106454878 A  2/2017
(Continued)

OTHER PUBLICATIONS

Extended European Search Report issued in European Application No. 19785187.6 dated Apr. 15, 2021, 12 pages.
(Continued)

*Primary Examiner* — Chuong A Ngo
(74) *Attorney, Agent, or Firm* — Fish & Richardson P.C.

(57) ABSTRACT

Event monitoring methods and apparatuses are provided. One method comprises: receiving, by an exposure function apparatus, a first message for configuring one or more monitoring events for a user group that comprises a plurality of members; obtaining, by the exposure function apparatus, member information of the plurality of members; determining, by the exposure function apparatus based on the member information, that one or more reports of the one or more monitoring events for each of the plurality of members are received; and deleting, by the exposure function apparatus, a monitoring event configuration of the one or more monitoring events generated based on the first message.

22 Claims, 8 Drawing Sheets

(51) Int. Cl.
*H04W 8/18* (2009.01)
*H04W 68/00* (2009.01)

(58) Field of Classification Search
CPC ...... H04W 24/08; H04W 24/00; H04L 67/26; H04L 67/306; H04L 43/06; H04L 41/069; H04L 67/20
See application file for complete search history.

(56) References Cited

FOREIGN PATENT DOCUMENTS

| CN | 107438996 A | 12/2017 |
|---|---|---|
| WO | 2016180961 A1 | 11/2016 |

OTHER PUBLICATIONS

Huawei et al., "Enable TB for MONTE procedures," SA WG2 Meeting #121, S2-173579, Hangzhou, PR China, May 15-19, 2017, 31 pages.

Huawei, "Handling of Maximum Number of Reports and Monitoring Duration," 3GPP TSG-CT WG3 Meeting #94, C3-180080, Gothenburg, Sweden, Jan. 22-26, 2018, 7 pages.

Huawei, "Remove the monitoring configuration for a group," 3GPP TSG-CT WG3 Meeting #97bis, C3-184440, Sophia-Antipolis, France, Jul. 9-13, 2018, 6 pages.

3GPP TS 23.682 V15.4.0 (Mar. 2018), "3rd Generation Partnership Project; Technical Specification Group Services and System Aspects; Architecture enhancements to facilitate communications with packet data networks and applications (Release 15)," Mar. 2018, 124 pages.

3GPP TS 23.502 V15.1.0 (Mar. 2018), "3rd Generation Partnership Project; Technical Specification Group Services and System Aspects; Procedures for the 5G System; Stage 2 (Release 15)," Mar. 2018, 285 pages.

Huawei, HiSilicon, "Correction to the Usage of Monitoring Duration," 3GPP TSG-SA WG2 Meeting #126, S2-181968, Montreal, Canada, Feb. 26-Mar. 2, 2018, 4 pages.

Office Action issued in Chinese Application No. 201810349848.3 dated Apr. 8, 2020, 22 pages (with English translation).

PCT International Search Report and Written Opinion issued in International Application No. PCT/CN2019/081696 dated Jul. 10, 2019, 15 pages (with English translation).

Office Action issued in Japanese Application No. 2020-552193 dated Nov. 24, 2021, 7 pages (with English translation).

Samsung, "Group Reporting Guard timer clarification," 3GPP TSG-SA WG2 Meeting # 122, S2-174799, San Jose Del Cabo, Mexico, Jun. 26-30, 2017, 11 pages.

* cited by examiner

EVENT MONITORING METHOD AND APPARATUS

CROSS-REFERENCE TO RELATED APPLICATIONS

This application is a continuation application of International Application No. PCT/CN2019/081696, filed on Apr. 8, 2019, which claims priority to Chinese Application No. 201810312936.6, filed on Apr. 9, 2018 and Chinese Application No. 201810349848.3, filed on Apr. 18, 2018. The disclosures of the aforementioned applications are hereby incorporated by reference in their entireties.

TECHNICAL FIELD

Embodiments of this application relate to the field of communications technologies, and in particular, to an event monitoring method and apparatus.

BACKGROUND

With the development of a mobile internet, an operator needs to interwork with a third-party application provider to guarantee a service provided by the third-party application provider. In a long term evolution (LTE) communications system, a service capability exposure function (SCEF) can enable a 3rd generation partnership project (3GPP) network to safely provide a service capability for a third-party service provider, so that internal and external applications and services are available and interwork with each other. A third-party application obtains the service capability from the SCEF by using a service capability server (SCS)/an application server (AS). A 5th generation (5G) communications system is a service-based architecture. A network exposure function (NEF) has a function similar to that of the SCEF, and the NEF provides, for the SCS/AS through a service, a service and a capability that are supported by the 3GPP network. In a service capability exposure architecture, both the LTE system and the 5G system can support the SCS/AS in monitoring an event for a user, and can monitor a plurality of events for the user, such as user equipment (UE) reachability and disconnection.

In the LTE system, through a monitoring event configuration, the SCEF may receive a monitoring request that carries an external group identifier, and the external group identifier is used to identify a group of members, and indicates that a monitoring event is to be performed on a member in the group. A core network element mobility management entity (MME)/serving GPRS support node (SGSN) sends a monitoring event report to the SCEF after monitoring an event for each member in the group. In the 5G communications system, the NEF may receive a monitoring request that carries an external group identifier, and an access and mobility management function (AMF) sends a monitoring event report to the SCEF after monitoring an event for each member in the group.

Neither the SCEF in the LTE system nor the NEF in the 5G system can learn whether requested monitoring event reports are completed for all members in the group. If the SCEF/NEF still retains a monitoring event configuration for the group after the requested monitoring event reports are completed for all the members in the group, resources are wasted, and a subsequent policy execution error is caused.

SUMMARY

Embodiments of this application provide an event monitoring method and apparatus, so that a service capability exposure function or a network exposure function can delete a monitoring event configuration for a group after receiving event reports for all members in the group, thereby avoiding a resource waste and a subsequent policy execution error.

Specific technical solutions provided in the embodiments of this application are as follows:

According to a first aspect, an event monitoring method is provided, where the method is performed by an exposure function entity. A specific procedure of the method is mainly as follows: receiving a first message, where the first message is used to configure a monitoring event for a user group; obtaining member information of the user group; determining, based on the member information, that monitoring event reports for all members in the user group are received; and deleting a monitoring event configuration for the user group. In this way, the exposure function entity obtains the member information of the user group, so that when receiving the monitoring event report, the exposure function entity can determine, based on the member information of the user group, that the monitoring event reports for all the members in the user group are received, and can further delete the monitoring event configuration for the user group, thereby avoiding a resource waste and helping ensure correct execution of a subsequent policy.

Optionally, the exposure function entity is a service capability exposure function SCEF entity, or the exposure function entity is a network exposure function NEF entity. In this way, the method provided in this embodiment of this application can adapt to an LTE system and a 5G system.

In a possible design, the member information of the user group may be a quantity of members included in the user group, and the quantity of members may be indicated by N. The member information of the user group may be alternatively an identifier of each member in the user group, in other words, the member information of the user group is N identifiers. In this way, the exposure function entity may determine, based on the quantity of members included in the user group or based on the identifier of the member, a quantity of members for which monitoring event reports are received, to determine whether the monitoring event reports for all the members in the user group are received.

In a possible design, the member information of the user group may be obtained in the following two manners or another manner. Manner 1: The first message carries the member information of the user group, and the member information of the user group is obtained from the first message. Manner 2: The member information of the user group that is sent by a user data management entity is received, in other words, the member information of the user group is obtained from the user data management entity. In this way, the member information of the user group is carried in existing signaling, thereby reducing overheads of adding new signaling.

In a possible design, the first message may further carry a maximum quantity of reports, and the maximum quantity of reports is used to indicate a maximum allowed quantity of times of reporting a monitoring event report for a member, or the maximum quantity of reports is used to indicate a maximum allowed quantity of times of reporting a monitoring event report for a monitoring event of a member, or the maximum quantity of reports is used to indicate a maximum allowed total quantity of times of reporting a monitoring event report for a plurality of monitoring events of a member. The maximum quantity of reports is set for each member in the user group, and is applicable to each member in the user group.

Optionally, the first message may further carry monitoring duration, and the monitoring duration is used to indicate an absolute time at which a monitoring request expires. The monitoring duration is set for each member in the user group, and is applicable to each member in the user group.

Determining that the monitoring event reports for all the members in the user group are received may include the following cases:

In a possible design, if the first message is used to configure a one-time monitoring request for the user group, the exposure function entity may determine, when receiving monitoring event reports for the N members, that the monitoring event reports for all the members in the user group are received.

Optionally, if the first message includes neither the maximum quantity of reports nor duration, the exposure function entity determines that the first message is used to configure the one-time monitoring request for the user group; or if the first message includes a first maximum quantity of reports and the first maximum quantity of reports is 1, the exposure function entity determines that the first message is used to configure the one-time monitoring request for the user group.

In a possible design, if the first message is used to configure a plurality of monitoring events for the user group, the exposure function entity determines, when receiving a monitoring event report of each of the plurality of monitoring events for each of the N members, that the monitoring event reports for all users in the member group are received.

In a possible design, if the first message includes a second maximum quantity of reports, the exposure function entity determines, when a quantity of times of receiving a monitoring event report for each of the N members reaches the second maximum quantity of reports, that the monitoring event reports for all the members in the member group are received.

Optionally, if the first message is used to configure a plurality of monitoring events for the user group, the exposure function entity determines, when a quantity of times of receiving a monitoring event report of each of the plurality of monitoring events for each of the N members reaches the second maximum quantity of reports, that the monitoring event reports for all the members in the user group are received.

In the foregoing several methods, it can be determined that the monitoring event reports for the members in the user group are received, to further initiate deletion of the monitoring event configuration for the user group.

In a possible design, if the member information of the user group includes the N identifiers, the exposure function entity determines, each time a monitoring event report is received, whether the monitoring event report is a monitoring event report for the member, to obtain a determining result. The determining result is used to determine whether the monitoring event reports for all the members in the user group are received. In this way, this can help ensure accuracy of determining whether the monitoring event reports of the members in the user group are received.

In a possible design, the deleting, by the exposure function entity, a monitoring event configuration for the user group includes at least one of the following operations: deleting, by the exposure function entity, a locally stored monitoring event configuration for the user group; sending, by the exposure function entity, a second message to the user data management entity, where the second message is used to instruct the user data management entity to delete the monitoring event configuration for the user group; and sending, by the exposure function entity, a third message to a third-party application entity, where the third message is used to instruct the third-party application entity to delete the monitoring event configuration for the user group. Optionally, the user data management entity is a home subscriber server HSS entity or a unified data management UDM entity.

According to a second aspect, an event monitoring method is provided, where the method is performed by an exposure function entity. A specific procedure of the method is mainly as follows: receiving a first message, where the first message is used to configure a monitoring event for a user group; obtaining member information of the user group; and determining, based on the member information, whether monitoring event reports for all members in the user group are completed. Optionally, when the monitoring event reports for all the members in the user group are completed, a monitoring event configuration for the user group is deleted, or sending of the monitoring event report to a third-party application is stopped. In this way, the exposure function entity obtains the member information of the user group, so that when receiving the monitoring event report, the exposure function entity can determine, based on the member information of the user group, that the monitoring event reports for all the members in the user group are received, and can further delete the monitoring event configuration for the user group or stop sending the monitoring event report to the third-party application, thereby avoiding a resource waste and helping ensure correct execution of a subsequent policy.

Optionally, the exposure function entity is a service capability exposure function SCEF entity, or the exposure function entity is a network exposure function NEF entity. In this way, the method provided in this embodiment of this application can adapt to an LTE system and a 5G system.

In a possible design, the member information of the user group may be a quantity of members included in the user group, and the quantity of members may be indicated by N. The member information of the user group may be alternatively an identifier of each member in the user group, in other words, the member information of the user group is N identifiers. In this way, the exposure function entity may determine, based on the quantity of members included in the user group or based on the identifier of the member, a quantity of members for which monitoring event reports are received, to determine whether the monitoring event reports for all the members in the user group are received.

In a possible design, the member information of the user group may be obtained in the following two manners or another manner. Manner 1: The first message carries the member information of the user group, and the member information of the user group is obtained from the first message. Manner 2: The member information of the user group that is sent by a user data management entity is received, in other words, the member information of the user group is obtained from the user data management entity. In this way, the member information of the user group is carried in existing signaling, thereby reducing overheads of adding new signaling.

In a possible design, the first message may further carry a maximum quantity of reports, and the maximum quantity of reports is used to indicate a maximum allowed quantity of times of reporting a monitoring event report for a member, or the maximum quantity of reports is used to indicate a maximum allowed quantity of times of reporting a monitoring event report for a monitoring event of a member, or the maximum quantity of reports is used to indicate a maximum allowed total quantity of times of reporting a monitoring event report for a plurality of monitoring events of a member. The maximum quantity of reports is set for each member in the user group, and is applicable to each member in the user group.

Optionally, the first message may further carry monitoring duration, and the monitoring duration is used to indicate an absolute time at which a monitoring request expires. The monitoring duration is set for each member in the user group, and is applicable to each member in the user group.

Determining that the monitoring event reports for all the members in the user group are completed may include the following cases:

In a possible design, if the first message is used to configure a one-time monitoring request for the user group, the exposure function entity may determine, when receiving monitoring event reports for the N members, that the monitoring event reports for all the members in the user group are completed.

Optionally, if the first message includes neither the maximum quantity of reports nor duration, the exposure function entity determines that the first message is used to configure the one-time monitoring request for the user group; or if the first message includes a first maximum quantity of reports and the first maximum quantity of reports is 1, the exposure function entity determines that the first message is used to configure the one-time monitoring request for the user group.

In a possible design, if the first message is used to configure the one-time monitoring request for the user group, and the first message is used to configure a plurality of monitoring events for the user group, the exposure function entity determines, when receiving a monitoring event report of each of the plurality of monitoring events for each of the N members, that the monitoring event reports for all users in the member group are completed.

In a possible design, if the first message includes a second maximum quantity of reports, the exposure function entity determines, when a quantity of times of receiving a monitoring event report for each of the N members reaches the second maximum quantity of reports, that the monitoring event reports for all the members in the member group are received.

In a possible design, if the first message includes a second maximum quantity of reports, and the first message is used to configure a plurality of monitoring events for the user group, the exposure function entity determines, when a quantity of times of receiving a monitoring event report of each of the plurality of monitoring events for each of the N members reaches the second maximum quantity of reports, that the monitoring event reports for all the members in the user group are completed.

In the foregoing several methods, it can be determined that the monitoring event reports of the members in the user group are completed, to further initiate deletion of the monitoring event configuration for the user group or stop sending the monitoring event report to the third-party application.

In a possible design, if the member information of the user group includes the N identifiers, the exposure function entity determines, each time a monitoring event report is received, whether the monitoring event report is a monitoring event report for the member, to obtain a determining result. The determining result is used to determine whether the monitoring event reports for all the members in the user group are completed. In this way, this can help ensure accuracy of determining whether the monitoring event reports of the members in the user group are completed.

In a possible design, the deleting, by the exposure function entity, a monitoring event configuration for the user group includes at least one of the following operations: deleting, by the exposure function entity, a locally stored monitoring event configuration for the user group; and sending, by the exposure function entity, a second message to a third-party application entity, where the second message is used to instruct the third-party application entity to delete the monitoring event configuration for the user group.

In a possible design, the deleting, by the exposure function entity, a monitoring event configuration for the user group includes: sending, by the exposure function entity, a third message to the user data management entity, where the third message is used to instruct the user data management entity to delete the monitoring event configuration for the user group; or sending, by the exposure function entity, a fourth message to the user data management entity, where the fourth message is used to instruct the user data management entity to delete a monitoring event configuration for one or more members in the user group.

In a possible design, if the exposure function entity determines that monitoring event reports for the one or more members are completed, the exposure function entity sends the fourth message to the user data management entity.

Optionally, the user data management entity is a home subscriber server HSS entity or the unified data management UDM entity.

In the foregoing descriptions, when the monitoring event reports of the members in the user group are completed, a monitoring event report for the user group is completed, and when it is determined that the monitoring event reports for all the members in the user group are completed, it is determined that the monitoring event report for the user group is completed.

According to a third aspect, an event monitoring apparatus is provided, where the apparatus has a function of implementing any one of the first aspect, the second aspect, the possible designs of the first aspect, or the possible designs of the second aspect. The function may be implemented by hardware, or may be implemented by hardware by executing corresponding software. The hardware or the software includes one or more modules corresponding to the function.

In a possible design, the apparatus may be a chip or an integrated circuit.

In a possible design, the apparatus includes a transceiver and a processor, the transceiver is used by the apparatus to communicate with another function entity or network element, and the processor is configured to execute a group of programs. When the programs are executed, the apparatus may perform the method according to any one of the first aspect or the possible designs of the first aspect.

In a possible design, the apparatus further includes a memory, and the memory stores the programs executed by the processor.

In a possible design, the apparatus is a service capability exposure function SCEF entity or a network exposure function NEF entity.

According to a fourth aspect, a chip is provided, where the chip is connected to a memory or the chip includes a memory, and is configured to read and execute a software program stored in the memory, to implement the method according to any one of the first aspect, the second aspect, the possible designs of the first aspect, or the possible designs of the second aspect.

According to a fifth aspect, an event monitoring method is provided, where the method is performed by a user data management entity. The method is specifically as follows: receiving a first request message, where the first request message is used to configure a monitoring event for a user group; and sending a first response message to an exposure function entity, where the first response message carries member information of the user group. In this way, the member information of the user group is sent to the exposure function entity, so that when receiving a monitoring event report, the exposure function entity can determine, based on the member information of the user group, that monitoring event reports for all members in the user group are received, and can further delete a monitoring event configuration for the user group or stop sending the monitoring event report to a third-party application, thereby avoiding a resource waste and helping ensure correct execution of a subsequent policy.

In a possible design, the member information of the user group may be a quantity of members included in the user group, and the quantity of members may be indicated by N. The member information of the user group may be alternatively an identifier of each member in the user group, in other words, the member information of the user group is N identifiers. In this way, the exposure function entity may determine, based on the quantity of members included in the user group or based on the identifier of the member, a quantity of members for which monitoring event reports are received, to determine whether the monitoring event reports for all the members in the user group are received.

In a possible design, the user data management entity receives a second request message sent by the exposure function entity, where the second request message carries information used to instruct to delete the monitoring event configuration for the user group, and the user data management entity deletes the monitoring event configuration for the user group based on the second request message.

In a possible design, the user data management entity receives a fourth request message sent by the exposure function entity, where the fourth request message carries information used to instruct the user data management entity to delete a monitoring event configuration for one or more members in the user group, and the user data management entity deletes the monitoring event configuration for the one or more members in the user group based on the fourth request message.

Optionally, the user data management entity is a home subscriber server HSS entity or the unified data management UDM entity.

According to a sixth aspect, an event monitoring apparatus is provided, where the apparatus has a function of implementing any one of the third aspect or the possible designs of the third aspect. The function may be implemented by hardware, or may be implemented by hardware by executing corresponding software. The hardware or the software includes one or more modules corresponding to the function.

In a possible design, the apparatus may be a chip or an integrated circuit.

In a possible design, the apparatus includes a transceiver and a processor, the transceiver is used by the apparatus to communicate with another function entity or network element, and the processor is configured to execute a group of programs. When the programs are executed, the apparatus may perform the method according to any one of the second aspect or the possible designs of the second aspect.

In a possible design, the apparatus further includes a memory, and the memory stores the programs executed by the processor.

In a possible design, the apparatus is an HSS entity or a UDM entity.

According to a seventh aspect, a chip is provided, where the chip is connected to a memory or the chip includes a memory, and is configured to read and execute a software program stored in the memory, to implement the method according to any one of the third aspect or the possible designs of the third aspect.

According to an eighth aspect, an event monitoring method is provided, where the method is performed by a third-party application entity. The method is specifically as follows: sending a first message to an exposure function entity, where the first message is used to configure a monitoring event for a user group, and the first message carries member information of the user group. In this way, the member information of the user group is sent to the exposure function entity, so that when receiving a monitoring event report, the exposure function entity can determine, based on the member information of the user group, that monitoring event reports for all members in the user group are received, and can further delete a monitoring event configuration for the user group, thereby avoiding a resource waste and helping ensure correct execution of a subsequent policy.

In a possible design, the member information of the user group may be a quantity of members included in the user group, and the quantity of members may be indicated by N. The member information of the user group may be alternatively an identifier of each member in the user group, in other words, the member information of the user group is N identifiers. In this way, the exposure function entity may determine, based on the quantity of members included in the user group or based on the identifier of the member, a quantity of members for which monitoring event reports are received, to determine whether the monitoring event reports for all the members in the user group are received.

In a possible design, a third message sent by the exposure function entity is received, where the third message carries information used to instruct to delete the monitoring event configuration for the user group, and the third-party application entity deletes the monitoring event configuration for the user group based on the third message.

Optionally, the third-party application entity is an SCS entity or an AS entity.

According to a ninth aspect, an event monitoring apparatus is provided, where the apparatus has a function of implementing any one of the fourth aspect or the possible designs of the fourth aspect. The function may be implemented by hardware, or may be implemented by hardware by executing corresponding software. The hardware or the software includes one or more modules corresponding to the function.

In a possible design, the apparatus may be a chip or an integrated circuit.

In a possible design, the apparatus includes a transceiver and a processor, the transceiver is used by the apparatus to communicate with another function entity or network element, and the processor is configured to execute a group of programs. When the programs are executed, the apparatus may perform the method according to any one of the fourth aspect or the possible designs of the fourth aspect.

In a possible design, the apparatus further includes a memory, and the memory stores the programs executed by the processor.

In a possible design, the apparatus is an SCS entity or an AS entity.

According to a tenth aspect, a chip is provided, where the chip is connected to a memory or the chip includes a memory, and is configured to read and execute a software program stored in the memory, to implement the method according to any one of the fourth aspect or the possible designs of the fourth aspect.

According to an eleventh aspect, a computer storage medium is provided, where the computer storage medium stores a computer program, and the computer program includes an instruction used to perform the method according to any one of the foregoing aspects or the possible designs of the foregoing aspects.

According to a twelfth aspect, a computer program product including an instruction is provided, where when the computer program product runs on a computer, the computer is enabled to perform the method according to any one of the foregoing aspects or the possible designs of the foregoing aspects.

DESCRIPTION OF EMBODIMENTS

Embodiments of this application provide an event monitoring method and apparatus, so that in group-based event monitoring, when receiving event reports for all members in a group, an SCEF in an LTE system or an NEF in a 5G system can delete a monitoring event configuration for the group in a timely manner, thereby saving resources and helping ensure correct execution of a subsequent policy.

A communications system architecture to which a method provided in the embodiments of this application can be applied is described below.

Figure 1:
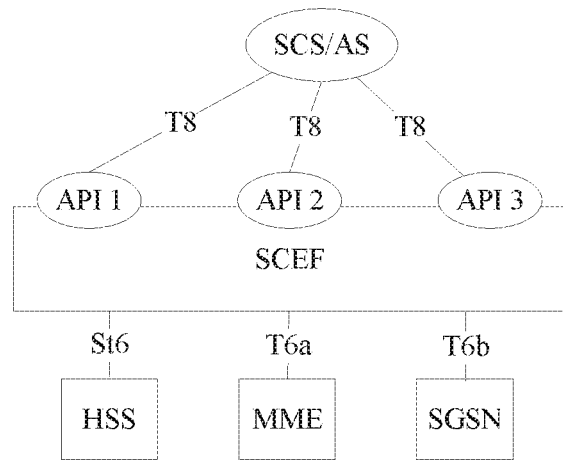
FIG. 1 is a diagram of a service capability exposure architecture in an LTE system according to an embodiment of this application.

FIG. 1 is a diagram of a service capability exposure (SCE) architecture in an LTE system, including an SCEF 101, an SCS/AS 102, a home subscriber server (HSS) 103, an MME 104, and an SGSN 105. In the LTE system, the SCEF 101 is a core network element in the service capability exposure architecture, and the SCEF 101 is configured to ensure that a network safely provides a service capability for a third-party service provider, so that internal and external applications and services are available and interwork with each other. A third-party application obtains the service capability from the SCEF 101 by using the SCS/AS 102. The HSS 103 is a home user subscription server, and is configured to store subscription information of a user. Mobility management network elements include the MME 104 and the SGSN 105, and are configured to perform mobility management on a terminal. The SCS/AS 102 invokes, by using a T8 API interface, the service capability provided by the SCEF 101.

Figure 2:
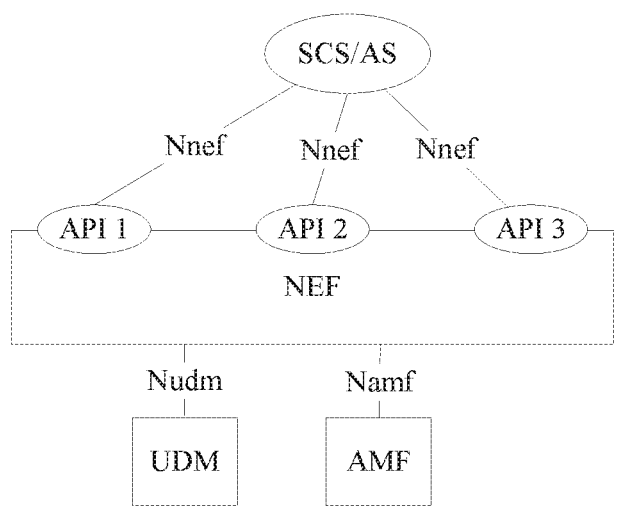
FIG. 2 is a diagram of a service capability exposure architecture in a 5G system according to an embodiment of this application.

FIG. 2 is a diagram of an SCE architecture in a 5G system, including an NEF 201, an SCS/AS 202, a UDM 203, and an AMF 204. In the 5G system, a function of the NEF 201 is similar to a function of the SCEF 101 in the LTE system. The NEF 201 opens, to the SCS/AS 202 through an Nnef service, a service and a capability that are supported by a 3GPP network. A function of the UDM 203 is similar to a function of the HSS 103 in the LTE system. The UDM 203 provides a supported service capability for the NEF 201 through an Nudm service. A mobility management network element includes the AMF 204. A function of the AMF 204 is similar to a function of the MME 104 in the LTE system. The AMF 204 provides a supported service and a supported capability for the NEF 201 through an Namf service.

It should be noted that the communications system architectures provided in FIG. 1 and FIG. 2 are examples. The method provided in the embodiments of this application is not limited to the two communications systems, and may be further applied to more communications systems.

Some terms in the embodiments of this application are explained and described below, to facilitate understanding of persons skilled in the art.

(1) Monitoring Event

In the embodiments of this application, based on the service capability exposure architecture shown in FIG. 1 or FIG. 2, the SCS/AS may monitor one or more events for a user. The event may be, for example, UE reachability, a connection loss, or a location.

(2) User Group

The user group is also referred to as a group. One user group includes one or more members, and a member is a user. In other words, one user group includes one or more users. In the embodiments of this application, a monitoring event configuration may be based on a group, and all members in a group have a same external group identifier.

(3) Member Information of a User Group

The member information of the user group is information related to a member included in the user group. For example, the member information may be a quantity of members included in the user group, and the quantity of members in this application is indicated by N, where N is a positive integer. The member information may be alternatively an identifier of each member included in the user group, and the identifiers are used to distinguish between different members, and may also be referred to as member identifiers or user identifiers. An external group identifier of a member in the group is used to distinguish between different user groups, and the member identifiers or the user identifiers are used to distinguish between different users (or members).

(4) Exposure Function Entity

The exposure function entity is an entity that can implement a service exposure function, and an entity whose function is the same as or similar to that of the SCEF 101 or the NEF 201. The exposure function entity may be the SCEF 101, or may be the NEF 201.

(5) Third-Party Application Entity

The third-party application entity is an entity whose function is the same as or similar to that of the SCS/AS 102 or the SCS/AS 202. The third-party application entity may be the SCS/AS 102, or may be the SCS/AS 202.

(6) Mobility Management Network Element

The mobility management network element is an entity whose function is the same as or similar to that of the MME 104 and the SGSN 105, or that of the AMF 204. The mobility management network element may be the MME 104 and the SGSN 105, or may be the AMF 204.

(7) User Data Management Entity

The user data management entity is an entity whose function is the same as or similar to that of the HSS 103 or the UDM 203. The user data management entity may be the HSS 103, or may be the UDM 203.

(8) Monitoring Event Report

The monitoring event report is content that is related to a monitoring event of a member in a user group and that is reported by the mobility management network element. The monitoring event report may carry content related to one or more monitoring events. The exposure function entity distinguishes between monitoring event reports of different monitoring events by using identifiers of the monitoring events, and distinguishes between monitoring event reports of different members by using identifiers of the members.

(9) The term "and/or" describes an association relationship for describing associated objects and represents that three relationships may exist. For example, A and/or B may represent the following three cases: Only A exists, both A and B exist, and only B exists. "A plurality of" mentioned in this application means "two or more". Words such as "first" and "second" are merely used for distinction and description, and shall not be understood as an indication or implication of relative importance or an indication or implication of an order. The character "/" generally indicates an "or" relationship between the associated objects.

An event monitoring method provided in an embodiment of this application is described in detail below with reference to the accompanying drawings.

Figure 3:
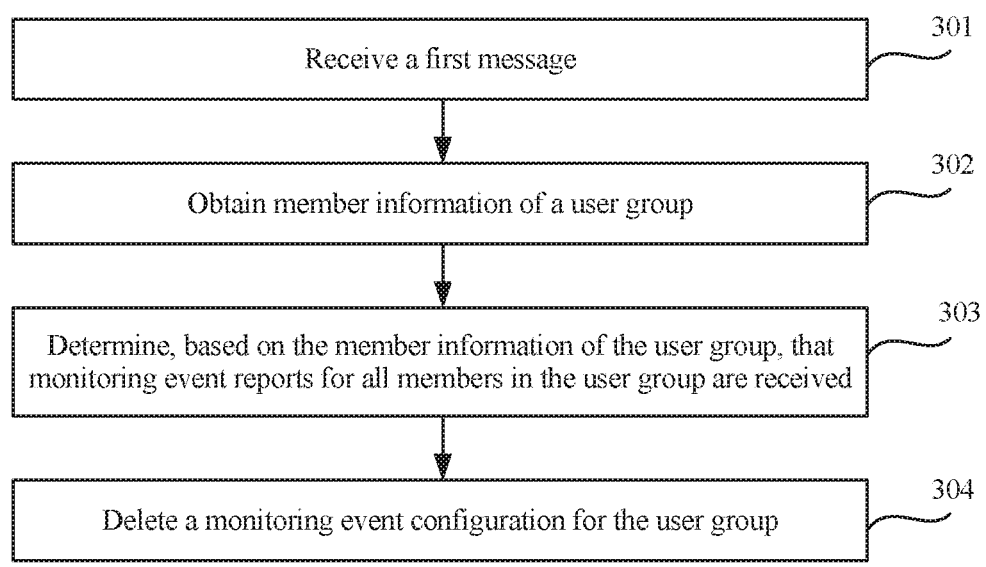
FIG. 3 is a schematic flowchart of an event monitoring method according to an embodiment of this application.

As shown in FIG. 3, a specific procedure of an event monitoring method provided in an embodiment of this application is as follows. The method is performed by an exposure function entity.

S301. Receive a first message.

The first message may be a monitoring request. The first message is used to configure a monitoring event for a user group, in other words, the first message is used to configure a monitoring request for the user group. The user group includes one or more members, and the monitoring event or the monitoring request for the user group is a monitoring event or a monitoring request for each member in the user group. The first message is used to configure one or more monitoring events for the user group. The one or more monitoring events are for each member in the user group. The first message may carry an external group identifier (external group ID) of the user group. The external group identifier is also for each member in the user group, and is used to distinguish between different user groups. The monitoring request may also be referred to as an event subscription, and the first message is used to subscribe to the monitoring event for the user group.

The first message may further carry a maximum quantity of reports, and the maximum quantity of reports is used to indicate a maximum quantity of times of reporting a monitoring event report for a member, or the maximum quantity of reports is used to indicate a maximum quantity of times of reporting a monitoring event report for a monitoring event of a member, or the maximum quantity of reports is used to indicate a maximum total quantity of times of reporting monitoring event reports for a plurality of monitoring events of a member. The maximum quantity of reports is set for each member in the user group, and is applicable to each member in the user group. The maximum quantity of reports is a positive integer.

The first message may further carry monitoring duration, and the monitoring duration is used to indicate an absolute time at which the monitoring request expires. The monitoring duration is set for each member in the user group, and is applicable to each member in the user group.

In actual application, the first message may be used to configure a one-time monitoring request for the user group. The one-time monitoring request means that a monitoring event report needs to be reported for each member in the user group only once. If there is one monitoring event, a monitoring event report is reported for the monitoring event once. If there are a plurality of monitoring events, a monitoring event report is reported once for any one of the plurality of monitoring events in the monitoring request or a monitoring event report is reported once for each of the plurality of monitoring events in the monitoring request.

Specifically, the first message is used to configure the one-time monitoring request for the user group, and there are the following several cases: (1) The first message includes the maximum quantity of reports, and the maximum quantity of reports is 1. (2) The first message includes neither the maximum quantity of reports nor the monitoring duration.

S302. Obtain member information of a user group.

2 The member information of the user group may be obtained in the following two manners or another manner. Manner 1: The first message carries the member information of the user group, and the member information of the user group is obtained from the first message. Manner 2: The member information of the user group that is sent by a user data management entity is received, in other words, the member information of the user group is obtained from the user data management entity. The user data management entity herein may be an HSS entity or a UDM entity.

S303. Determine, based on the member information of the user group, that monitoring event reports for all members in the user group are received.

Specifically, the exposure function entity receives a monitoring event report one or more times, and each time the exposure function entity receives a monitoring event report, the exposure function entity locally stores the received monitoring event report, and determines, based on the received event report and the member information of the user group, whether the monitoring event reports for all the members are received (in other words, determines whether the monitoring event reports for all the members are completed). Each time a mobility management network element reports a monitoring event report, the mobility management network element further reports a monitoring request identifier (an SCEF reference identifier or an NEF event notification identifier), a monitoring event identifier, and a member identifier, and the monitoring request identifier, the monitoring event identifier, and the member identifier are carried in the monitoring event report or carried in a specific type of message together with the monitoring event report, for example, a monitoring response message. The exposure function entity determines a user group to which the monitoring event report belongs, the monitoring event, and the member based on the monitoring request identifier, the monitoring event identifier, and the member identifier.

The member information of the user group may be a quantity of members included in the user group, and the quantity of members may be indicated by N. The member information of the user group may be alternatively an identifier of each member in the user group, in other words, the member information of the user group is N identifiers. Each time a monitoring event report is received, the exposure function entity can determine a user group to which the monitoring event report belongs, a monitoring event, and a member to which the monitoring event report belongs. Based on this, the exposure function entity determines that the monitoring event reports for all the members in the user group are received, and there may be the following several cases.

Case 1

The first message is used to configure a one-time monitoring request for the user group. In this case, a monitoring event report needs to be received for one monitoring event of a member only once.

If the first message includes one monitoring event, in other words, the first message is used to configure one monitoring event for the user group, there are the following situations:

Considering that the member information of the user group is the quantity N of members in the user group, the exposure function entity may determine, when receiving N monitoring event reports, that the monitoring event reports for all the members in the user group are received, where the N monitoring event reports belong to different members, in other words, the N monitoring event reports are monitoring event reports for N different members. Because the exposure function entity can determine a member to which a monitoring event report belongs, the exposure function entity can determine a quantity of different members for which monitoring event reports are received.

Considering that the member information of the user group is the N identifiers, the exposure function entity compares an identifier of a member associated with a received monitoring event report with the N identifiers. If monitoring event reports of members of the N identifiers are received, the exposure function entity may determine that the monitoring event reports for all the members in the user group are received (in other words, determine that the monitoring event reports for all the members in the user group are completed).

If the first message includes a plurality of monitoring events, in other words, the first message is used to configure a plurality of monitoring events for the user group, for example, M monitoring events, there are the following situations:

Considering that the member information of the user group is the quantity N of members in the user group, the exposure function entity may also determine, when receiving N monitoring event reports, that the monitoring event reports for all the members in the user group are received. If the first message includes the plurality of monitoring events, in other words, the first message is used to configure the plurality of monitoring events for the user group, for example, M monitoring events, when receiving a monitoring event report for each of the N members, or receiving a monitoring event report for each of the M monitoring events of each of the N members, the exposure function entity determines that the monitoring event reports for all the members in the user group are received (in other words, determines that the monitoring event reports for all the members in the user group are completed).

Considering that the member information of the user group is the N identifiers, the exposure function entity may also determine, when receiving monitoring event reports for members of the N identifiers, that the monitoring event reports for all the members in the user group are received. Alternatively, the exposure function entity compares an identifier of a member associated with a received monitoring event report with the N identifiers, and compares an identifier of a monitoring event associated with the received monitoring event report with identifiers of the M monitoring events, and if a monitoring event report for each of the M monitoring events for each of members of the N identifiers is received, the exposure function entity determines that the monitoring event reports for all the members in the user group are received (in other words, determines that the monitoring event reports for all the members in the user group are completed).

Case 2

The first message carries the maximum quantity of reports, and the maximum quantity of reports is greater than 1. In this case, only when the monitoring event reports for all the members in the user group each reach the maximum quantity of reports, it can be determined that the monitoring event reports for all the members in the user group are received (in other words, it is determined that the monitoring event reports for all the members in the user group are completed).

The exposure function entity determines, based on the quantity N of members in the user group or the N identifiers, a quantity of different members for which monitoring event reports are received, and when a quantity of times of receiving a monitoring event report for each of the N members reaches the maximum quantity of reports, determines that the monitoring event reports for all the members in the member group are received. If the first message includes the plurality of monitoring events, in other words, the first message is used to configure the plurality of monitoring events for the user group, for example, M monitoring events, when a quantity of times of receiving an event report for each of the N members reaches the maximum quantity of reports, or a quantity of times of receiving a monitoring event report for each of the M monitoring events for each of the N members reaches the maximum quantity of reports, the exposure function entity determines that the monitoring event reports for all the members in the user group are received (in other words, determines that the monitoring event reports for all the members in the user group are completed).

S304. Delete a monitoring event configuration for the user group.

Specifically, the exposure function entity locally deletes the monitoring event configuration for the user group. Optionally, the exposure function entity may further send a message to a third-party application entity, to instruct the third-party application entity to delete the monitoring event configuration for the user group. Optionally, the exposure function entity may further send a message to the user data management entity, to instruct the user data management entity to delete the monitoring event configuration for the user group or to instruct the user data management entity to delete a monitoring event configuration for one or more members in the user group.

In a possible implementation, if the member information of the user group is the N identifiers, each time a monitoring event report is received, the exposure function entity may further determine whether the received monitoring event report is a monitoring event report for the member in the user group. Specifically, the exposure function entity determines whether an identifier of a member associated with the received monitoring event report is in the N identifiers. If yes, the exposure function entity determines that the received monitoring event report is a monitoring event report for the member in the user group; or otherwise, the exposure function entity determines that the received monitoring event report is not a monitoring event report for the member in the user group. A determining result is used to further determine whether the monitoring event reports for all the members in the user group are received (in other words, determine that the monitoring event reports for all the members in the user group are completed).

In conclusion, according to the event monitoring method provided in this embodiment of this application, the exposure function entity obtains the member information of the user group, so that when receiving the monitoring event report, the exposure function entity can determine, based on the member information of the user group, that the monitoring event reports for all the members in the user group are received, and can further delete the monitoring event configuration for the user group or stop sending the monitoring event report to the third-party application, thereby avoiding a resource waste and helping ensure correct execution of a subsequent policy.

The event monitoring method in this application is further described in detail with reference to specific application scenarios based on the method provided in the foregoing embodiment.

Application scenario 1: an LTE system. An exposure function entity is an SCEF, a third-party application entity is an SCS/AS, mobility management network elements are an MME and an SGSN, and a user data management entity is an HSS.

Figure 4:
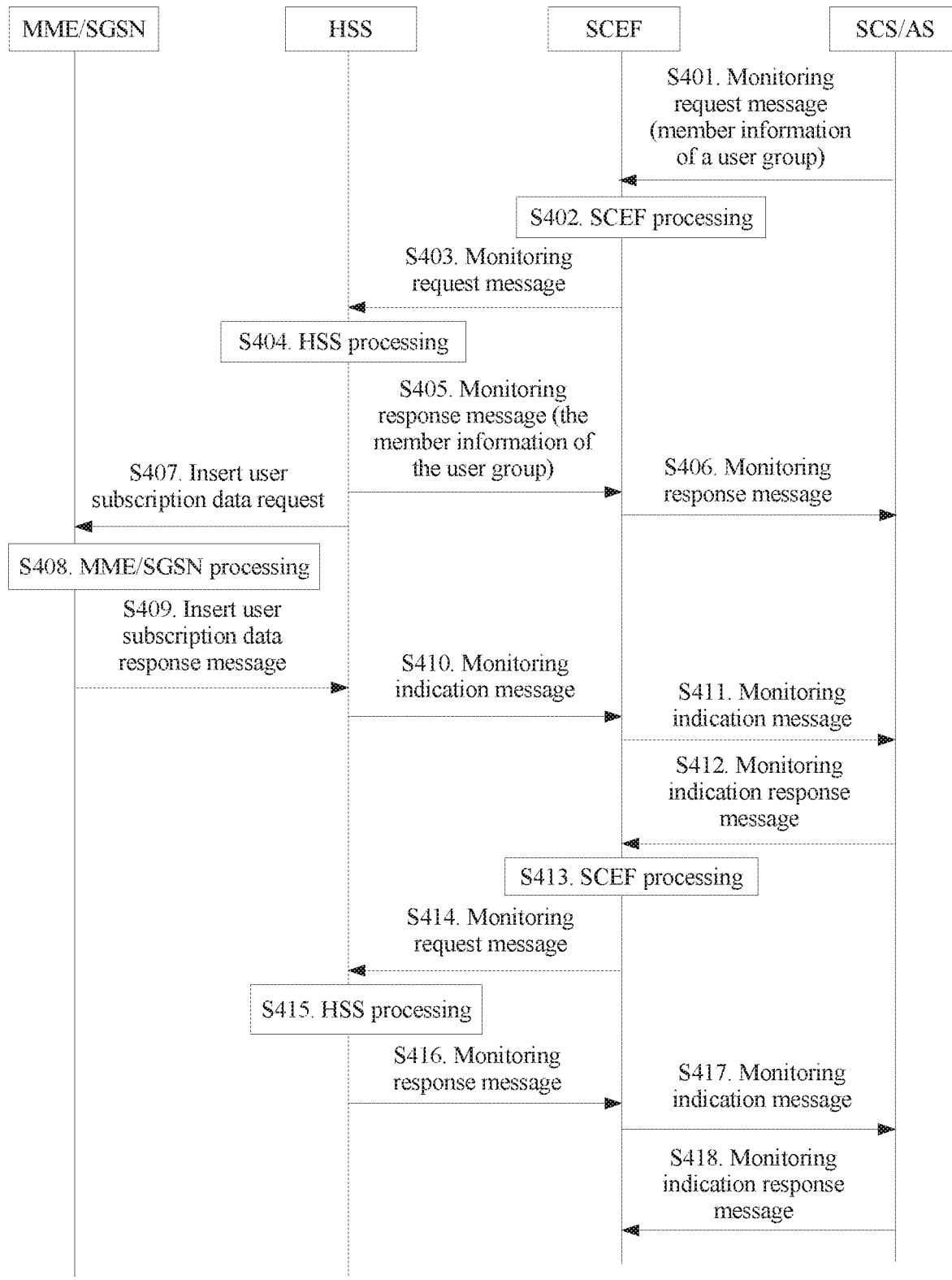
FIG. 4 is a schematic flowchart 1 of event monitoring in an application scenario 1 according to an embodiment of this application.

As shown in FIG. 4, a procedure of event monitoring in the application scenario 1 is specifically described as follows:

S401. The SCS/AS sends, to the SCEF, a first monitoring request message configured based on a user group, and the SCEF receives the first monitoring request message sent by the SCS/AS.

The first monitoring request message is the first message in the foregoing embodiment, and has an attribute and a function of the first message.

The first monitoring request message carries member information of the user group, and may further carry, but is not limited to, at least one of the following information: an SCS/AS identifier, a T8 destination address, a monitoring type, an external group identifier, a T8 long term transaction reference identifier (T8 Long Term Transaction Reference ID, TLTRI), a maximum quantity of reports, and/or monitoring duration. The maximum quantity of reports and/or the monitoring duration are/is applied to each member in the user group. If the first monitoring request message carries neither the maximum quantity of reports nor the monitoring duration, or the first monitoring request message carries the maximum quantity of reports and a value of the maximum quantity of reports is 1, it indicates that the first monitoring request message is a one-time monitoring request.

S402. The SCEF stores various information carried in the received first monitoring request message, and the SCEF authorizes a configured monitoring request based on a local policy. After the authorization succeeds, the SCEF allocates an SCEF reference identifier (SCEF reference ID), and stores a correspondence between the SCEF reference ID and the TLTRI. The SCEF reference ID is used to identify the monitoring request in a core network, to further determine the user group.

S403. The SCEF sends a second monitoring request message to the HSS, and the HSS receives the second monitoring request message sent by the SCEF.

The second monitoring request message carries one or more types of information carried in the first monitoring request message in S401, and certainly does not need to carry the member information of the user group. For example, the second monitoring request message may carry the external group identifier, an SCEF identifier, the SCEF reference identifier, and the monitoring type.

S404. The HSS checks the second monitoring request message. After the check succeeds, the HSS stores the information carried in the received second monitoring request message. The HSS determines a group member corresponding to the external group identifier.

S405. The HSS returns a first monitoring response message to the SCEF, and the SCEF receives the first monitoring response message sent by the HSS.

The first monitoring response message is used to acknowledge the second monitoring request message, and the first monitoring response message may carry the member information of the user group. The first monitoring response message may further carry the SCEF reference identifier and a receiving indication.

S406. The SCEF returns a second monitoring response message to the SCS/AS, and the SCS/AS receives the second monitoring response message returned by the SCEF.

The second monitoring response message carries the TLTRI and a receiving indication.

S407 to S409 are performed for each member in the user group.

S407. The HSS sends an insert user subscription data request to all MMEs/SGSNs serving the user group.

The insert user subscription data request carries the monitoring type, the SCEF identifier, the SCEF reference identifier, the maximum quantity of reports and/or the monitoring duration, and the external identifier or a mobile subscriber international integrated services digital network/public switched telephone network number (Mobile Subscriber International ISDN/PSTN number, MSISDN).

S408. The MME/SGSN stores a parameter carried in the received insert user subscription data request, and performs corresponding processing.

For example, the MME/SGSN sets a quantity of remaining reports based on the maximum quantity of reports. The MME/SGSN may alternatively set the quantity of remaining reports to 1 for the one-time monitoring request.

S409. The MME/SGSN sends an insert user subscription data response message to the HHS, and the HHS receives the insert user subscription data response message sent by the MME/SGSN.

The insert user subscription data response message carries a receiving indication. If the MME/SGSN already has a monitoring event of a current monitoring request, the MME/SGSN adds a monitoring event report to the insert user subscription data response message. Further, if neither the maximum quantity of reports nor the monitoring duration is carried in S407, or the quantity of remaining reports is 1, the MME/SGSN locally deletes a monitoring event configuration for the user group. If a value of the maximum quantity of reports carried in S407 is greater than 1, the MME/SGSN subtracts 1 from the quantity of remaining reports.

S410. If the insert user subscription data response message carries a monitoring event report in S409, the HSS sends a first monitoring indication message to the SCEF, and the SCEF receives the first monitoring indication message sent by the HSS.

The first monitoring indication message carries the SCEF reference ID, the monitoring event report, and the external identifier or the MSISDN corresponding to the monitoring event report. In actual application, the HSS may aggregate a plurality of monitoring event reports from the MME/SGSN, and send the plurality of monitoring event reports to the SCEF by using a monitoring indication message. To be specific, the monitoring indication message carries a list of correspondences between the SCEF reference ID, the monitoring event reports, and the external identifier or the MSISDN.

S411. The SCEF sends a second monitoring indication message to the SCS/AS, and the SCS/AS receives the second monitoring indication message sent by the SCEF.

The second monitoring indication message carries the TLTRI, the monitoring event report, and the external identifier or the MSISDN. If the first monitoring indication message in S410 carries the plurality of monitoring event reports, the second monitoring indication message carries a list of correspondences between the TLTRI, the monitoring event reports, and the external identifier or the MSISDN.

S412. The SCS/AS returns a monitoring indication response message to the SCEF, and the SCEF receives the monitoring indication response message returned by the SCS/AS.

S413. A processing process of the SCEF includes the following several cases.

If the first monitoring request message is a one-time monitoring request in S401, and the MME/SGSN already has the monitoring event of the current monitoring request in S409, the MME/SGSN adds the monitoring event report to the insert user subscription data response message, and the HSS sends, to the SCEF, the monitoring event report from the MME/SGSN in S410. The SCEF first determines, based on the SCEF reference ID, a user group corresponding to the event report, and then determines, based on the member information (for example, N identifiers or a quantity N of members) of the user group received in S401 or S405, whether the monitoring event report received in S410 includes monitoring event reports for all members. If the monitoring event report includes the monitoring event reports for all the members, the SCEF determines that the monitoring event reports for all the members in the user group are received (in other words, determines that the monitoring event reports for all the members in the user group are completed), and initiates deletion of the monitoring event configuration for the user group or stops sending the monitoring event report to the SCS/AS. If the first monitoring request message includes a plurality of monitoring events, in other words, the first monitoring request message is used to configure a plurality of monitoring events for the user group, for example, M monitoring events, based on the monitoring event report received in S410, when receiving a monitoring event report for each of the N members, or receiving a monitoring event report for each of the M monitoring events of each of the N members, the SCEF determines that the monitoring event reports for all the members in the user group are received (in other words, determines that the monitoring event reports for all the members in the user group are completed). When the monitoring event reports for all the members in the user group are completed, a monitoring event report for the user group is completed.

Specifically, a process of determining, based on the member information of the user group, that the monitoring event reports for all the members in the user group are received is as follows: If the member information is the quantity of members, the SCEF determines, based on a quantity of identifiers (MSISDNs or external identifiers) of different members associated with the monitoring event report received in S410, a quantity of members for which monitoring event reports are received, and when the quantity of members for which monitoring event reports are received reaches the quantity of members in the member information, determines that the monitoring event reports for all the members in the user group are received. If the member information is an identifier of each member, the SCEF compares identifiers of different members associated with the monitoring event report received in S410 with the member identifier in the member information, to determine a quantity of members for which monitoring event reports are received, and when identifiers of the members for which monitoring event reports are received reach all member identifiers in the member information, determines that the monitoring event reports for all the members in the user group are received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received.

The monitoring event configuration for the user group is deleted by using S414 to S418.

S414. The SCEF sends a third monitoring request message to the HSS, and the HSS receives the third monitoring request message sent by the SCEF.

The third monitoring request message carries the SCEF reference ID and a deletion instruction. The deletion instruction is used to instruct the HSS to delete the monitoring event configuration for the user group.

S415. The HSS deletes the monitoring event configuration for the user group based on the third monitoring request message.

S416. The HSS sends a third monitoring response message to the SCEF, and the SCEF receives the third monitoring response message sent by the HSS.

The third monitoring response message is used to acknowledge the third monitoring request message.

S417. The SCEF sends a fourth monitoring request message to the SCS/AS, and the SCS/AS receives the fourth monitoring request message sent by the SCEF.

The fourth monitoring request message carries the TLTRI and a deletion instruction, and the deletion instruction is used to instruct the SCS/AS to delete the monitoring event configuration for the user group.

S418. The SCS/AS returns a fourth monitoring response message to the SCEF, and the SCEF receives the fourth monitoring response message returned by the SCS/AS.

The fourth monitoring response message is used to acknowledge the fourth monitoring request message.

It should be noted that S414 and S417 are not performed in a strict sequence, and may exchange sequences, or may be simultaneously performed.

If the MME/SGSN already has the monitoring event of the current monitoring request in S409, the MME/SGSN adds the monitoring event report to the insert user subscription data response message, but the value of the maximum quantity of reports is greater than 1. Alternatively, the monitoring event report is not reported in S409 and S410. In these two cases, steps S410 to S418 are omitted. S401 to S409 are a procedure for configuring the monitoring event for the user group. After S409, subsequent event monitoring may be implemented based on a monitoring procedure shown in FIG. 5.

In addition, if the SCEF temporarily does not perform S414 to S418 for some reason, and in this period, the SCEF receives an event report for the monitoring request in step S401, the SCEF stops sending the monitoring event report to the SCS/AS.

Figure 5:
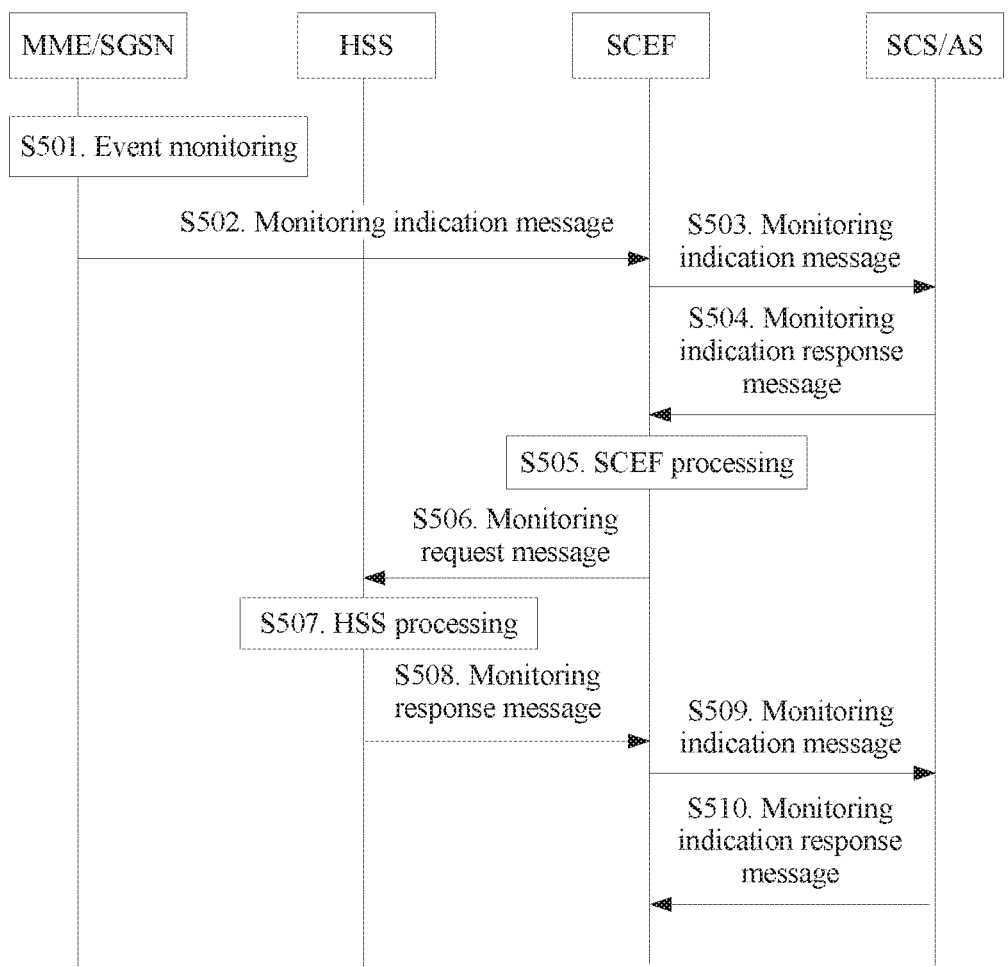
FIG. 5 is a schematic flowchart 2 of event monitoring in an application scenario 1 according to an embodiment of this application.

As shown in FIG. 5, a specific monitoring procedure is described below.

S501. After receiving an insert subscriber data request message in S407 in FIG. 4, the MME/SGSN obtains information or a parameter carried in the insert subscriber data request message, and monitors an event for a member in a user group based on the information or the parameter.

It should be understood that members in the user group may belong to a same mobility management entity, or may belong to different mobility management entities, and there may be one or more mobility management entities serving the user group. Each mobility management entity performs a same procedure or similar procedures for members in a user group served by the mobility management entity.

S502. When detecting an event for the member in the user group, the MME/SGSN sends a monitoring indication message to the SCEF, and the SCEF receives the monitoring indication message sent by the MME/SGSN.

The monitoring indication message carries an SCEF reference ID, a monitoring event report, and an external identifier or an MSISDN. If the first monitoring request message in S401 is a one-time monitoring request, the MME/SGSN further locally deletes a monitoring event configuration for the user group. If a value of a maximum quantity of reports included in the first monitoring request message in S401 is greater than 1, the MME/SGSN subtracts 1 from a recorded quantity of remaining reports. When the quantity of remaining reports is 0, the MME/SGSN locally deletes the monitoring event configuration for the user group.

S503. The SCEF sends a monitoring indication message to the SCS/AS, and the SCS/AS receives the monitoring indication message sent by the SCEF.

The monitoring indication message carries a TLTRI, the monitoring event report, and the external identifier or the MSISDN.

Optionally, the SCEF may aggregate a plurality of monitoring event reports from the MME/SGSN, add the plurality of monitoring event reports to a monitoring indication message, and send the monitoring indication message to the SCS/AS. In this case, the monitoring indication message carries a list of correspondences between the TLTRI, the monitoring event reports, and the external identifier or the MSISDN.

S504. The SCS/AS returns a monitoring indication response message to the SCEF, and the SCEF receives the monitoring indication response message returned by the SCS/AS.

The monitoring indication response message is used to acknowledge the monitoring indication message received in S503.

S505. Processing of the SCEF may include two types of processing.

For a first type of processing, a process includes the following several cases.

The SCEF determines, based on the SCEF reference ID received in S502, a user group corresponding to the event report, and then determines, based on member information of the user group that is received in S401 or S405, whether monitoring event reports for all members are received. If the monitoring event reports for all the members are received, the SCEF determines that the monitoring event reports for all the members in the user group are received (in other words, determines that the monitoring event reports for all the members in the user group are completed), and initiates deletion of a monitoring event configuration for the user group or stops sending the monitoring event report to the SCS/AS. When the monitoring event reports for all the members in the user group are completed, a monitoring event report for the user group is completed.

Specifically, a process of determining that the monitoring event reports for all the members in the user group are received is as follows:

If the first monitoring request message in S401 is a one-time monitoring request, a process of determining, based on the member information (for example, N identifiers or a quantity N of members) of the user group, that the monitoring event reports for all the members in the user group are received is as follows: If the member information is the quantity of members, the SCEF determines, based on a quantity of identifiers (MSSDNs or external identifiers) of different members associated with the monitoring event report received in S502, a quantity of members for which monitoring event reports are received, and when the quantity of members for which monitoring event reports are received reaches the quantity of members in the member information, determines that the monitoring event reports for all the members in the user group are received. If the member information is an identifier of each member, the SCEF compares identifiers of different members associated with the monitoring event report received in S502 with the member identifier in the member information, to determine a quantity of members for which monitoring event reports are received, and when identifiers of the members for which monitoring event reports are received reach all member identifiers in the member information, determines that the monitoring event reports for all the members in the user group are received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received. If the first monitoring request message includes a plurality of monitoring events, in other words, the first monitoring request message is used to configure a plurality of monitoring events for the user group, for example, M monitoring events, based on the monitoring event report received in S502, when receiving a monitoring event report for each of the N members, or receiving a monitoring event report for each of the M monitoring events of each of the N members, the SCEF determines that the monitoring event reports for all the members in the user group are received.

If the value of the maximum quantity of reports is greater than 1, a process in which the SCEF determines, based on the member information (for example, N identifiers or a quantity N of members) of the user group, that the monitoring event reports for all the members in the user group are received is as follows: If the member information is the quantity of members, the SCEF determines, based on a quantity of identifiers (MSISDNs or external identifiers) of different members associated with the monitoring event report received in S502, a quantity of members for which monitoring event reports are received, and determines whether an accumulated quantity of reports for each member reaches the maximum quantity of reports. When the quantity of members for which monitoring event reports are received reaches the quantity of members in the member information, and the accumulated quantity of reports for each member reaches the maximum quantity of reports, the SCEF determines that the monitoring event reports for all the members in the user group are received. If the member information is an identifier of each member, the SCEF compares identifiers of different members associated with the monitoring event report received in S502 with the member identifier in the member information, to determine a quantity of members for which monitoring event reports are received, and determines whether an accumulated quantity of reports for each member reaches the maximum quantity of reports. When identifiers of the members for which monitoring event reports are received reach all member identifiers in the member information, and the accumulated quantity of reports for each member reaches the maximum quantity of reports, the SCEF determines that the monitoring event reports for all the members in the user group are received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received.

If the first message includes the plurality of monitoring events, in other words, the first message is used to configure the plurality of monitoring events for the user group, for example, M monitoring events, when a quantity of times of receiving an event report for each of the N members reaches the maximum quantity of reports, or a quantity of times of receiving a monitoring event report for each of the M monitoring events of each of the N members reaches the maximum quantity of reports, the SCEF determines that the monitoring event reports for all the members in the user group are received.

The monitoring event configuration for the user group is deleted by using S506 to S510. (In the first type of processing, S506 to S510 only need to be performed once.)

S506. The SCEF sends a monitoring request message to the HSS, and the HSS receives the monitoring request message sent by the SCEF.

The monitoring request message carries the SCEF reference ID and a deletion instruction. The deletion instruction is used to instruct the HSS to delete the monitoring event configuration for the user group.

S507. The HSS deletes the monitoring event configuration for the user group based on the monitoring request message.

S508. The HSS sends a monitoring response message to the SCEF, and the SCEF receives the monitoring response message sent by the HSS.

The monitoring response message is used to acknowledge the monitoring request message received in S506.

S509. The SCEF sends a monitoring request message to the SCS/AS, and the SCS/AS receives the monitoring request message sent by the SCEF.

The monitoring request message carries the TLTRI and a deletion instruction, and the deletion instruction is used to instruct the SCS/AS to delete the monitoring event configuration for the user group.

S510. The SCS/AS returns a monitoring response message to the SCEF, and the SCEF receives the monitoring response message returned by the SCS/AS.

The monitoring response message is used to acknowledge the monitoring request message in S509.

It should be noted that S506 and S509 are not performed in a strict sequence, and may exchange sequences, or may be simultaneously performed. S503 and S505 are not performed in a strict sequence, and may exchange sequences, or may be simultaneously performed.

For a second type of processing, a process includes the following several cases.

The SCEF determines, based on the SCEF reference ID received in S502, a user group corresponding to the event report, determines whether a monitoring event report for any member corresponding to the event report is received (in other words, whether the monitoring event report is completed), and if the monitoring event report for the any member corresponding to the event report is received, requests the HSS to delete a monitoring event configuration for the member. The SCEF further determines, based on the member information of the user group that is received in S401 or S405, whether the monitoring event reports for all the members in the user group are received (in other words, whether the monitoring event reports are completed). If the monitoring event reports for all the members in the user group are received, the following is performed: locally deleting the monitoring event configuration for the user group, and requesting the SCS/AS to delete the monitoring event configuration for the user group or stopping sending the event report to the SCS/AS. Optionally, a message may be further sent to the HSS, and the message is used to instruct the HSS to delete the monitoring event configuration for the user group. It should be noted that, each time it is determined that a monitoring event report for a member is received, the SCEF requests the HSS to delete a monitoring event configuration for the member. Therefore, that the SCEF sends, to the HSS, the message used to instruct to delete the monitoring event configuration for the user group herein is an optional step. Alternatively, if the SCEF further determines that a request message for deleting a monitoring event configuration for all the members in the user group has been sent to the HSS, the SCEF locally deletes the monitoring event configuration for the user group, and requests the SCS/AS to delete the monitoring event configuration for the user group or stops sending the event report to the SCS/AS. When the monitoring event reports for all the members in the user group are completed, a monitoring event report for the user group is completed.

Specifically, a process of determining that the monitoring event reports for the members corresponding to the event reports are received is as follows:

If the first monitoring request message is the one-time monitoring request in S401 and the event report of the member is received in S502, the SCEF determines that the monitoring event report for the member corresponding to the event report is received. If the value of the maximum quantity of reports is greater than 1 and after S502, a quantity of times of receiving an event report for a member reaches the maximum quantity of reports, the SCEF determines that a monitoring event report for the member corresponding to the event report is received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine that the monitoring event report for the corresponding member is received. If the first message includes the plurality of monitoring events, in other words, the first message is used to configure the plurality of monitoring events for the user group, for example, M monitoring events, when a quantity of times of receiving an event report for a member reaches the maximum quantity of reports, or a quantity of times of receiving a monitoring event report for each of the M monitoring events for a member reaches the maximum quantity of reports, the SCEF determines that the monitoring event report for the member corresponding to the event report is received.

Similarly, S506 to S508 are used to request the HSS to delete the monitoring event configuration for the member. (In the second type of processing, S506 to S508 need to be performed for a plurality of times, or even N times.)

S506. The SCEF sends a monitoring request message to the HSS, and the HSS receives the monitoring request message sent by the SCEF.

The monitoring request message carries the SCEF reference ID, an external group identifier, the member identifier (in other words, the external identifier and/or the MSISDN), and a deletion instruction. The deletion instruction is used to instruct the HSS to delete the monitoring event configuration for the member corresponding to the member identifier.

S507. The HSS deletes the monitoring event configuration for the member based on the monitoring request message.

S508. The HSS sends a monitoring response message to the SCEF, and the SCEF receives the monitoring response message sent by the HSS.

The monitoring response message is used to acknowledge the monitoring request message received in S506.

Optionally, the SCEF adds a plurality of member identifiers to the monitoring request message in S506, and the HSS deletes a monitoring event configuration corresponding to the plurality of member identifiers.

A process of determining that the monitoring event reports for all the members in the user group are received is as follows:

If the first monitoring request message in S401 is a one-time monitoring request, a process of determining, based on the member information (for example, N identifiers or a quantity N of members) of the user group, that the monitoring event reports for all the members in the user group are received is as follows: If the member information is the quantity of members, the SCEF determines, based on a quantity of identifiers (MSISDNs or external identifiers) of different members associated with the monitoring event report received in S502, a quantity of members for which monitoring event reports are received, and when the quantity of members for which monitoring event reports are received reaches the quantity of members in the member information, determines that the monitoring event reports for all the members in the user group are received. If the member information is an identifier of each member, the SCEF compares identifiers of different members associated with the monitoring event report received in S502 with the member identifier in the member information, to determine a quantity of members for which monitoring event reports are received, and when identifiers of the members for which monitoring event reports are received reach all member identifiers in the member information, determines that the monitoring event reports for all the members in the user group are received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received. If the first monitoring request message includes a plurality of monitoring events, in other words, the first monitoring request message is used to configure a plurality of monitoring events for the user group, for example, M monitoring events, based on the monitoring event report received in 502, when receiving a monitoring event report for each of the N members, or receiving a monitoring event report for each of the M monitoring events of each of the N members, the SCEF determines that the monitoring event reports for all the members in the user group are received.

If the value of the maximum quantity of reports is greater than 1, a process in which the SCEF determines, based on the member information (for example, N identifiers or a quantity N of members) of the user group, that the monitoring event reports for all the members in the user group are received is as follows: if the member information is the quantity of members, the SCEF determines, based on a quantity of identifiers (MSISDNs or external identifiers) of different members associated with the monitoring event report received in S502, a quantity of members for which monitoring event reports are received, and determines whether an accumulated quantity of reports for each member reaches the maximum quantity of reports. When the quantity of members for which monitoring event reports are received reaches the quantity of members in the member information, and the accumulated quantity of reports for each member reaches the maximum quantity of reports, the SCEF determines that the monitoring event reports for all the members in the user group are received. If the member information is an identifier of each member, the SCEF compares identifiers of different members associated with the monitoring event report received in S502 with the member identifier in the member information, to determine a quantity of members for which monitoring event reports are received, and determines whether an accumulated quantity of reports for each member reaches the maximum quantity of reports. When identifiers of the members for which monitoring event reports are received reach all member identifiers in the member information, and the accumulated quantity of reports for each member reaches the maximum quantity of reports, the SCEF determines that the monitoring event reports for all the members in the user group are received. Optionally, when receiving the identifier of the member associated with the monitoring event report, the SCEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received.

If the first message includes the plurality of monitoring events, in other words, the first message is used to configure the plurality of monitoring events for the user group, for example, M monitoring events, when a quantity of times of receiving an event report for each of the N members reaches the maximum quantity of reports, or a quantity of times of receiving a monitoring event report for each of the M monitoring events of each of the N members reaches the maximum quantity of reports, the SCEF determines that the monitoring event reports for all the members in the user group are received.

The monitoring event configuration for the user group is deleted by using S509 and S510.

S509. The SCEF sends a monitoring request message to the SCS/AS, and the SCS/AS receives the monitoring request message sent by the SCEF.

The monitoring request message carries the TLTRI and a deletion instruction, and the deletion instruction is used to instruct the SCS/AS to delete the monitoring event configuration for the user group.

S510. The SCS/AS returns a monitoring response message to the SCEF, and the SCEF receives the monitoring response message returned by the SCS/AS.

The monitoring response message is used to acknowledge the monitoring request message in S509.

The monitoring request messages and the monitoring response messages that are sent in different steps in FIG. 5 are not distinguished. It can be understood that messages with a same name may carry same content or may carry different content. Steps shown in S505 to S510 in FIG. 5 are the same. However, actually, based on the foregoing descriptions, the steps may be differently explained based on two different types of processing of the SCEF in S505. For detailed descriptions of the steps, refer to the foregoing descriptions.

In addition, if the SCEF temporarily does not perform S506 to S510 for some reason, and in this period, the SCEF receives an event report for the monitoring request in step S401, the SCEF stops sending the monitoring event report to the SCS/AS.

In conclusion, according to the methods shown in FIG. 4 and FIG. 5, in the LTE system, the SCEF obtains the member information of the user group, so that when receiving the monitoring event report, the SCEF can determine, based on the member information of the user group, that the monitoring event reports for all the members in the user group are received, and can further delete the monitoring event configuration for the user group or stop the event report, thereby avoiding a resource waste and helping ensure correct execution of a subsequent policy.

Application scenario 2: a 5G system. An exposure function entity is an NEF, a third-party application entity is an SCS/AS, a mobility management network element is an AMF, and a user data management entity is a UDM 203.

Figure 6A:
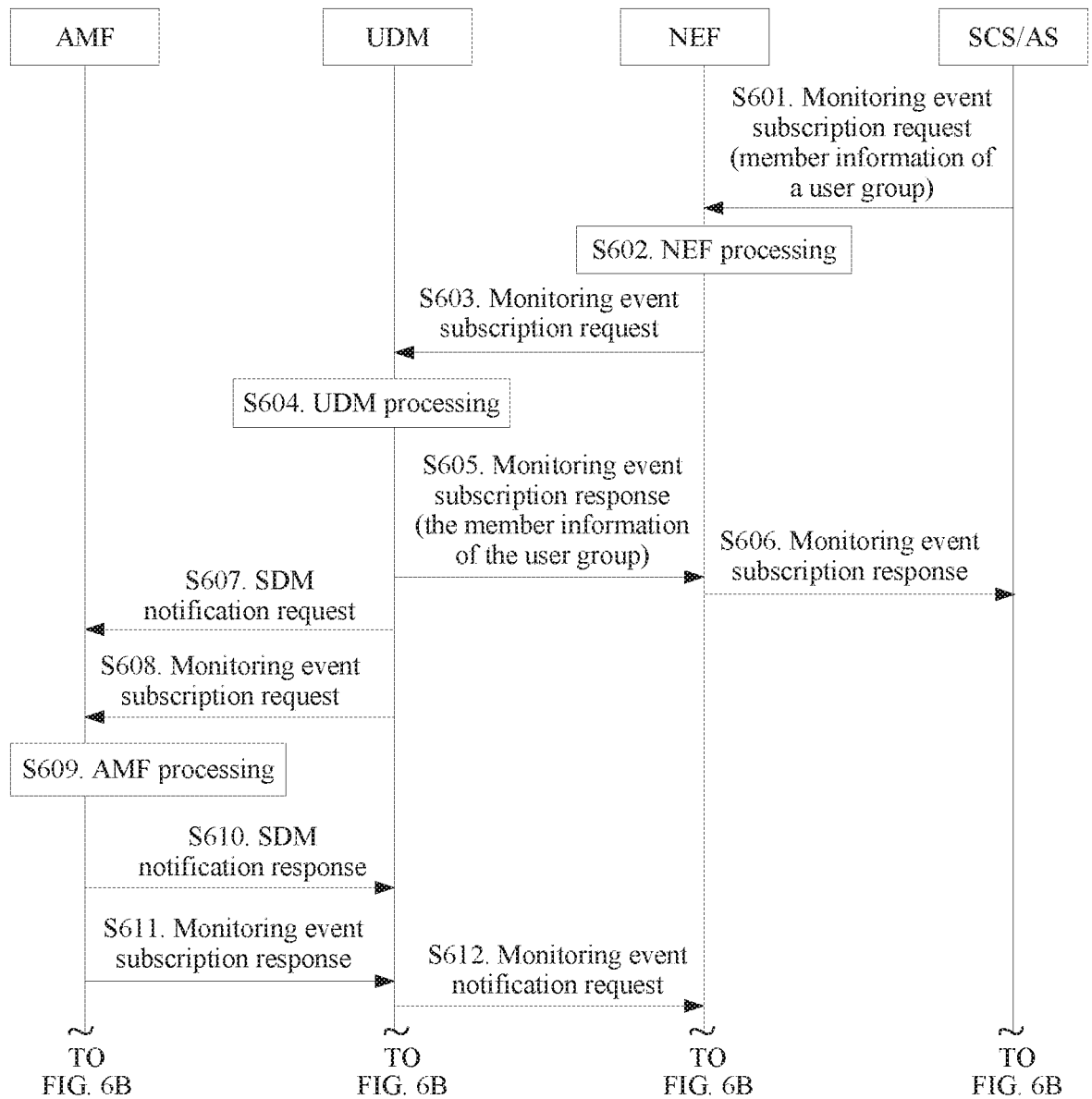
FIG. 6A and FIG. 6B are a schematic flowchart 1 of event monitoring in an application scenario 2 according to an embodiment of this application.
Figure 6B:
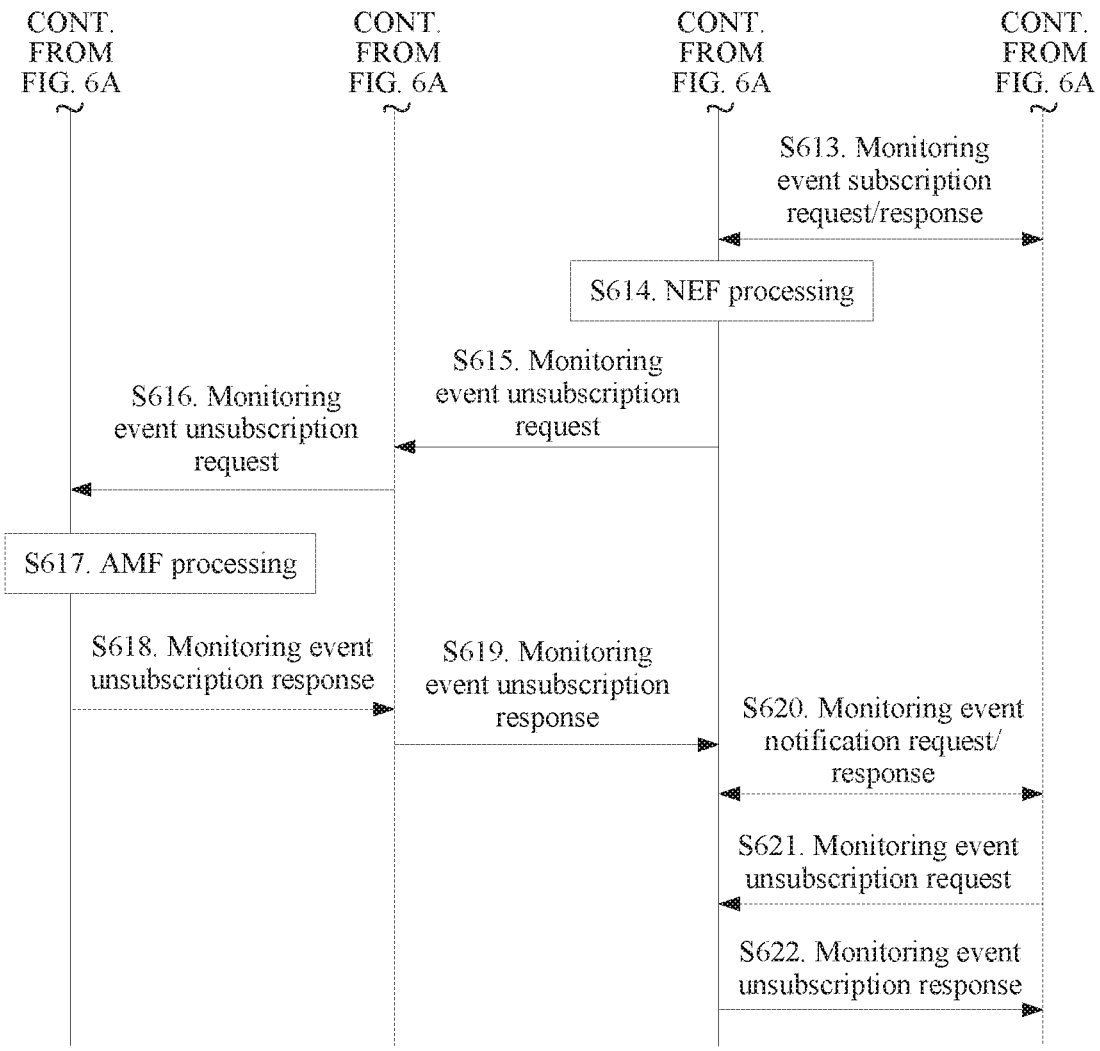

As shown in FIG. 6A and FIG. 6B, a procedure of event monitoring in the application scenario 2 is specifically described as follows:

S601. The SCS/AS sends a user group-based monitoring event subscription request (Nnef_EventExposure_Subscribe request) message to the NEF, and the NEF receives the Nnef_EventExposure_Subscribe request message sent by the SCS/AS. The Nnef_EventExposure_Subscribe request message is the first message in the foregoing embodiment, and has an attribute and a function of the first message.

The Nnef_EventExposure_Subscribe request message carries member information of a user group, and may further carry, but is not limited to, at least one of the following information: an SCS/AS event notification address, an SCS/AS event notification identifier, a monitoring event (Monitoring Event), an external group identifier (External Group Id), and an event reporting mode. A value of the event reporting mode may be reporting of a maximum quantity of times being reached, periodic reporting, or reporting of maximum duration being reached. If an event reporting granularity is reporting of a maximum quantity of times being reached, the Nnef_EventExposure_Subscribe request message further carries a maximum quantity of reports.

A parameter configuration in a monitoring event subscription request message is applicable to each member in the user group. If the event report granularity is reporting of a maximum quantity of times being reached, and a value of the maximum quantity of reports carried in the Nnef_EventExposure_Subscribe request message is 1, it indicates that the Nnef_EventExposure_Subscribe request message is a one-time monitoring request.

In the 5G system, a monitoring event subscription may be similar to a monitoring event configuration in an LTE system.

S602. The NEF stores various information carried in the message received in S601, and the NEF authorizes a subscribed monitoring request based on a local policy.

S603. The NEF sends a monitoring event subscription request message, namely, an Nudm_EventExposure_Subscribe request message, to the UDM, and the UDM receives the Nudm_EventExposure_Subscribe request message sent by the NEF.

The message carries the external group ID, the monitoring event, an NEF event notification address, and an NEF event notification identifier, and may further carry some optional parameters in the Nnef_EventExposure_Subscribe request message in S601. The NEF event notification address and the NEF event notification identifier are used to associate a future event notification, to determine the user group.

S604. The UDM checks the Nudm_EventExposure_Subscribe request message received in S603, and after the check succeeds, the UDM stores the parameters carried in the message. The UDM determines a correspondence between the external group identifier and an identifier of a member in the user group.

S605. The UDM sends a monitoring event subscription response (Nudm_EventExposure_Subscribe Response) message to the NEF, and the NEF receives the monitoring event subscription response message sent by the UDM.

Optionally, the monitoring event subscription response message carries the member information of the user group. The monitoring event subscription response message further carries a received UDM subscription identifier and a receiving indication.

S606. The NEF sends a monitoring event subscription response (Nnef_EventExposure_Subscribe Response) message to the SCS/AS, and the SCS/AS receives the monitoring event subscription response message sent by the NEF.

The message carries an NEF subscription identifier and a receiving indication.

S607 to S611 are performed for each member in the user group.

S607. The UDM sends, for a member in a user group, a subscription data management (Subscriber Data Management, SDM) notification request message (Nudm_SDM_Notification Request) to the AMF that serves the member, and the AMF receives the SDM notification request message sent by the UDM.

The message carries an external identifier or an MSISDN, and may further carry the maximum quantity of reports.

S608. The UDM sends a monitoring event subscription request (Namf_EventExposure_Subscribe Request) message to the AMF for the member in S607, and the AMF receives the Namf_EventExposure_Subscribe request message sent by the UDM.

The message carries the monitoring event, the NEF event notification address, and the NEF event notification identifier.

S609. The AMF stores the parameters in the received Namf_EventExposure_Subscribe request message, and performs corresponding processing.

A processing process includes: setting a quantity of remaining reports based on the maximum quantity of reports.

S610. The AMF sends an SDM notification response (Nudm_SDM_Notification Response) message to the UDM, and the UDM receives the Nudm_SDM_Notification response message sent by the AMF.

The message carries a receiving indication.

S611. The AMF returns a monitoring event subscription response (Namf_EventExposure_Subscribe Response) message to the UDM, and the UDM receives the Namf_EventExposure_Subscribe response message sent by the AMF.

The message carries an AMF subscription identifier and a receiving indication. If the AMF has a monitoring event report of the current subscribed monitoring event, the AMF adds the monitoring event report, the NEF event notification address, and the NEF event notification identifier to the Namf_EventExposure_Subscribe response message. Further, if a monitoring event subscription in S607 is a first-time monitoring request, the AMF locally deletes a monitoring event configuration for the user group. If a value of the maximum quantity of reports carried in S607 is greater than 1, the AMF subtracts 1 from the quantity of remaining reports.

If the monitoring event report is carried in S611, subsequent steps are performed. Otherwise, no subsequent step is performed.

S612. The UDM sends a monitoring event notification request (Ndum_EventExposure_Notify Request) message to the NEF, and the NEF receives the Ndum_EventExposure_Notify request message sent by the UDM. The NEF returns an Ndum_EventExposure_Notify response message to the UDM.

The Ndum_EventExposure_Notify request message carries the NEF event notification identifier, the monitoring event report, and the external identifier or the MSISDN corresponding to the monitoring event report. In actual application, the UDM may aggregate a plurality of monitoring event reports from the AMF, and send the plurality of monitoring event reports to the NEF by using a monitoring event notification request message. To be specific, the monitoring event notification request message carries a list of correspondences between the NEF event notification identifier, the monitoring event reports, and the external identifier or the MSISDN.

S613. The NEF sends a monitoring event subscription request (Nnef_Event Exposure_Notify Request) message to the SCS/AS, and the SCS/AS receives the Nnef_EventExposure_Notify request message sent by the NEF. The SCS/AS returns a monitoring event subscription response (Nnef_EventExposure_Notify Response) message to the NEF, and the NEF receives the Nnef_EventExposure_Notify response message returned by the SCS/AS.

The Nnef_EventExposure_Notify request message carries the SCS/AS event notification identifier, the monitoring event report, and the external identifier or the MSISDN. If a plurality of monitoring event reports are carried in S612, the Nnef_EventExposure_Notify request message carries a list of correspondences between the SCS/AS event notification identifier, the monitoring event reports, and the external identifier or the MSISDN.

S614. A processing process of the NEF includes the following several cases.

If the monitoring event subscription request message in S601 is a one-time monitoring request, the AMF adds the monitoring event report to the Namf_EventExposure_Subscribe response message in S611, and the UDM sends, to the NEF, the monitoring event report from the AMF in S612, the NEF determines, based on the received NEF notification identifier, the user group corresponding to the event report, and then determines, based on the member information of the user group received in S601 or S605, whether the monitoring event report received in S612 includes monitoring event reports for all members. If the monitoring event report includes the monitoring event reports for all the members, the NEF determines that the monitoring event reports for all the members in the user group are received (in other words, determines that the monitoring event reports for all the members in the user group are completed), and initiates deletion of the monitoring event configuration for the user group or stops sending the monitoring event report to the SCS/AS. When the monitoring event reports for all the members in the user group are completed, a monitoring event report for the user group is completed.

Specifically, a process of determining, based on the member information (for example, N identifiers or a quantity N of members) of the user group, that the monitoring event reports for all the members in the user group are received is as follows: If the member information is the quantity of members, the NEF determines, based on a quantity of identifiers (MSISDNs or external identifiers) of different members associated with the monitoring event report received in S612, a quantity of members for which monitoring event reports are received, and when the quantity of members for which monitoring event reports are received reaches the quantity of members in the member information, determines that the monitoring event reports for all the members in the user group are received. If the member information is an identifier of each member, the NEF compares identifiers of different members associated with the monitoring event report received in S612 with the member identifier in the member information, to determine a quantity of members for which monitoring event reports are received, and when identifiers of the members for which monitoring event reports are received reach all member identifiers in the member information, determines that the monitoring event reports for all the members in the user group are received. Optionally, when receiving the identifier of the member associated with the monitoring event report, the NEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received. If the monitoring event subscription request includes a plurality of monitoring events, in other words, the monitoring event subscription request is used to configure a plurality of monitoring events for the user group, for example, M monitoring events, based on the monitoring event report received in S612, when receiving a monitoring event report for each of the N members, or receiving a monitoring event report for each of the M monitoring events of each of the N members, the NEF determines that the monitoring event reports for all the members in the user group are received.

The monitoring event subscription for the user group is deleted by using S615 to S622.

S615. The NEF sends a monitoring event unsubscription request (Nudm_EventExposure_Unsubscribe Request) to the UDM, and the Nudm_EventExposure_Unsubscribe request message carries a UDM subscription identifier. The UDM receives the Nudm_EventExposure_Unsubscribe request message sent by the NEF.

S616. The UDM sends a monitoring event unsubscription request (Namf_EventExposure_Unsubscribe Request) to the AMF, and the AMF receives the Namf_EventExposure_Unsubscribe request sent by the UDM.

The Namf_EventExposure_Unsubscribe request message carries an AMF subscription identifier.

S617. The AMF deletes monitoring event subscription information corresponding to the AMF subscription identifier.

S618. The AMF returns a response message to the UDM.

S619. The UDM deletes monitoring event subscription information corresponding to the UDM subscription identifier, and returns an acknowledgment message to the NEF.

S620. The NEF sends a monitoring event notification request (Nnef_EventExposure_Notify Request) message to the SCS/AS, and the Nnef_EventExposure_Notify request message carries an SCS event notification identifier and a deletion instruction. The SCS/AS returns a response message.

S621. The SCS/AS sends a monitoring event unsubscription request (Nnef_EventExposure_Unsubscribe Request) message to the NEF, and the monitoring event unsubscription request (Nnef_EventExposure_Unsubscribe request) message carries an NEF subscription identifier.

S622. The NEF returns an acknowledgment message after deleting event subscription information corresponding to the NEF subscription identifier.

It should be noted that S615 and S620 are not performed in a strict sequence, and may exchange sequences, or may be simultaneously performed.

In addition, if the NEF temporarily does not perform S615 to S622 for some reason, and in this period, the NEF receives the monitoring event report for the monitoring event subscription request in step S601, and the SCEF stops sending the monitoring event report to the SCS/AS.

Figure 7:
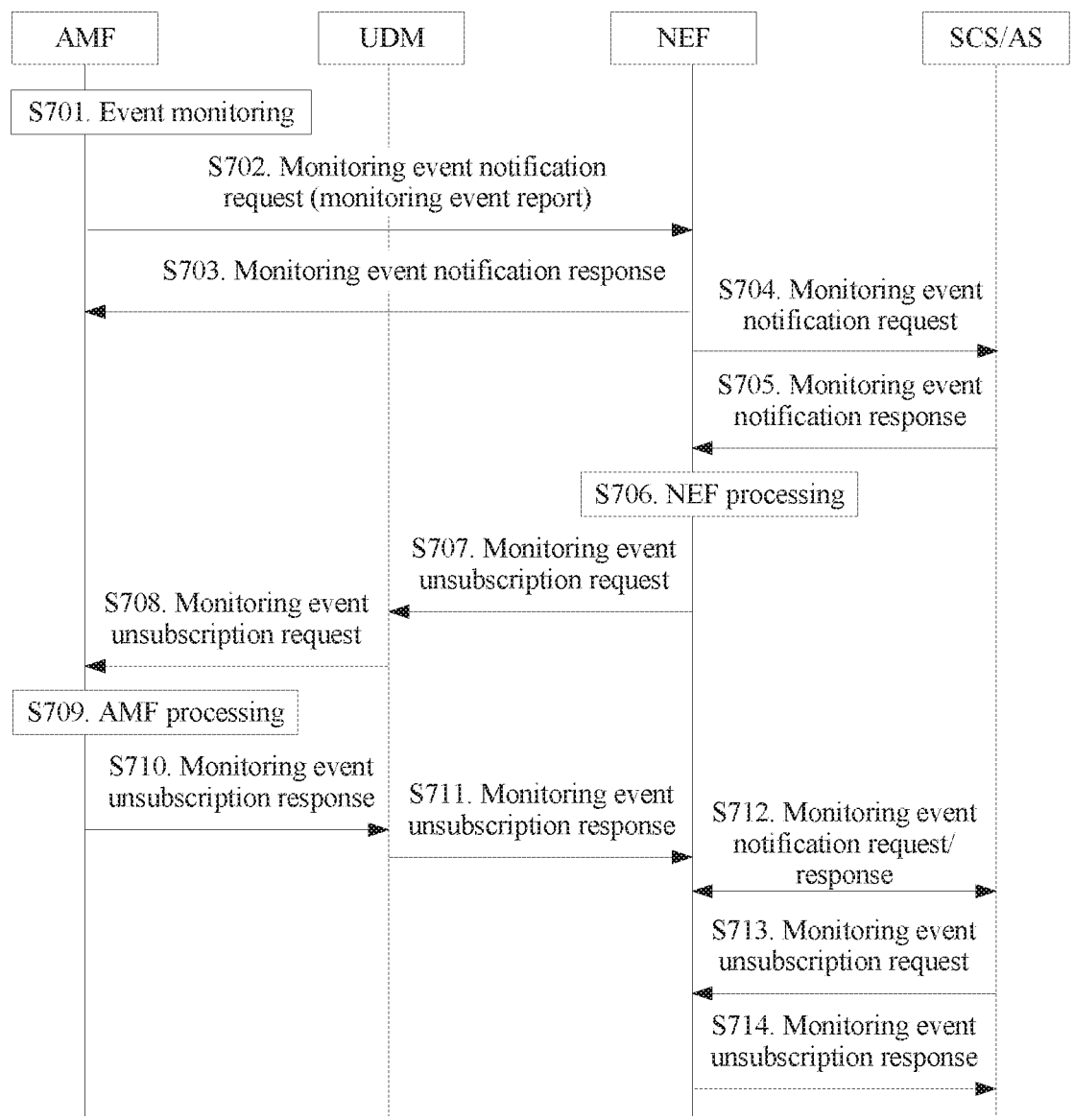
FIG. 7 is a schematic flowchart 2 of event monitoring in an application scenario 2 according to an embodiment of this application.

If the AMF carries the monitoring event report in S611, but the value of the maximum quantity of reports is greater than 1, or the AMF does not report the monitoring event report in S611, subsequent event monitoring may be implemented based on a monitoring procedure shown in FIG. 7.

As shown in FIG. 7, a specific monitoring procedure is described below.

S701. After receiving the Nudm_SDM_Notification response message in S610 in FIG. 6A, the AMF monitors an event for a member in a user group based on a parameter carried in the Nudm_SDM_Notification response message.

It should be understood that members in the user group may belong to a same AMF, or may belong to different AMFs. and there may be one or more AMFs serving the user group. Each AMF performs a same procedure or similar procedures for members in a user group served by the AMF.

S702. The AMF sends a monitoring event notification request message, namely, an Namf_EventExposure_Notify request, to the NEF, where the Namf_EventExposure_Notify request message carries an NEF event notification address, an NEF event notification identifier, a monitoring event report, and an external identifier or an MSISDN corresponding to the monitoring event report. If an event reporting mode is reporting of a maximum quantity of times being reached and a maximum quantity of reports is 1, the AMF locally deletes a monitoring event subscription for the user group. If a value of the maximum quantity of reports is greater than 1, the AMF subtracts 1 from a recorded quantity of remaining reports. When the quantity of remaining reports is 0, the AMF locally deletes the monitoring event configuration for the user group.

S703. The NEF returns an acknowledgment message, namely, an Namf_EventExposure_Notify response, to the AMF, and the AMF receives the Namf_EventExposure_Notify response returned by the NEF.

S704. The NEF sends a monitoring event notification request, namely, an Nnef_EventExposure_Notify request, to the SCS/AS, where the Nnef_EventExposure_Notify request message carries an SCS/AS event notification identifier, a monitoring event report, and an external identifier or an MSISDN.

Optionally, the NEF may aggregate a plurality of monitoring event reports from the AMF, and send the plurality of monitoring event reports to the SCS/AS by using an Nnef_EventExposure_Notify request message, where the Nnef_EventExposure_Notify request message carries a list of correspondences between the SCS/AS event notification identifier, the monitoring event reports, and the external identifier or the MSISDN.

S705. The SCS/AS returns an acknowledgment message, namely, an Nnef_EventExposure_Notify response, to the NEF, and the NEF receives the Nnef_EventExposure_Notify response returned by the SCS/AS.

S706. A processing process of the NEF includes the following several cases.

The NEF determines, based on an event notification identifier received in S602, the user group corresponding to the event report, and then determines, based on the member information of the user group that is received in S601 or S605, whether monitoring event reports for all members are received. If it is determined that the monitoring event reports for all the members are received, the NEF determines that the monitoring event reports for all the members in the user group are received (determines that the monitoring event reports for all the members in the user group are completed), and initiates deletion of the monitoring event configuration for the user group or stops sending the monitoring event report to the SCS/AS. When the monitoring event reports for all the members in the user group are completed, a monitoring event report for the user group is completed.

Specifically, a process of determining that the monitoring event reports for all the members in the user group are received is as follows:

If the monitoring event subscription request in S601 is a one-time monitoring request, a process of determining, based on the member information (for example, N identifiers or a quantity N of members) of the user group, that the monitoring event reports for all the members in the user group are received is as follows: If the member information is the quantity of members, the NEF determines, based on a quantity of identifiers (MSISDNs or external identifiers) of different members associated with the monitoring event report received in S612, a quantity of members for which monitoring event reports are received, and when the quantity of members for which monitoring event reports are received reaches the quantity of members in the member information, determines that the monitoring event reports for all the members in the user group are received. If the member information is an identifier of each member, the NEF compares identifiers of different members associated with the monitoring event report received in S612 with the member identifier in the member information, to determine a quantity of members for which monitoring event reports are received, and when identifiers of the members for which monitoring event reports are received reach all member identifiers in the member information, determines that the monitoring event reports for all the members in the user group are received. Optionally, when receiving the identifier of the member associated with the monitoring event report, the NEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received. If a first monitoring request message includes a plurality of monitoring events, in other words, the first monitoring request message is used to configure a plurality of monitoring events for the user group, for example, M monitoring events, based on the monitoring event report received in S612, when receiving a monitoring event report for each of the N members, or receiving a monitoring event report for each of the M monitoring events of each of the N members, the NEF determines that the monitoring event reports for all the members in the user group are received.

If the value of the maximum quantity of reports is greater than 1, a process in which the NEF determines, based on the member information (for example, N identifiers or a quantity N of members) of the user group, that the monitoring event reports for all the members in the user group are received is as follows: If the member information is the quantity of members, the NEF determines, based on a quantity of identifiers (MSISDNs or external identifiers) of different members associated with the monitoring event report received in S612, a quantity of members for which monitoring event reports are received, and determines whether an accumulated quantity of reports for each member reaches the maximum quantity of reports. When the quantity of members for which monitoring event reports are received reaches the quantity of members in the member information, and the accumulated quantity of reports for each member reaches the maximum quantity of reports, the NEF determines that the monitoring event reports for all the members in the user group are received.

If the member information is an identifier of each member, the NEF compares identifiers of different members associated with the monitoring event report received in S612 with the member identifier in the member information, to determine a quantity of members for which monitoring event reports are received, and determines whether an accumulated quantity of reports for each member reaches the maximum quantity of reports. When identifiers of the members for which monitoring event reports are received reach all member identifiers in the member information, and the accumulated quantity of reports for each member reaches the maximum quantity of reports, the NEF determines that the monitoring event reports for all the members in the user group are received. Optionally, when receiving the identifier of the member associated with the monitoring event report, the NEF determines, based on whether the identifier of the member exists in the member identifier in the member information, whether the member with the identifier is a member in the user group, and when determining that the member with the identifier is a member in the user group, continues to determine whether the monitoring event reports for all the members in the user group are received.

If the first message includes the plurality of monitoring events, in other words, the first message is used to configure the plurality of monitoring events for the user group, for example, M monitoring events, when a quantity of times of receiving an event report for each of the N members reaches the maximum quantity of reports, or a quantity of times of receiving a monitoring event report for each of the M monitoring events of each of the N members reaches the maximum quantity of reports, the NEF determines that the monitoring event reports for all the members in the user group are received.

The monitoring event subscription for the user group is deleted by using S707 to S714. Specifically, S707 to S714 are the same as S615 to S622, and repeated parts are not described again.

In addition, if the NEF temporarily does not perform S707 to S714 for some reason, and in this period, the NEF receives the monitoring event report for the monitoring event subscription request in step S601, the NEF stops sending the monitoring event report to the SCS/AS.

In conclusion, according to the methods shown in FIG. 6A and FIG. 6B and FIG. 7, in the 5G system, the NEF obtains the member information of the user group, so that when receiving the monitoring event report, the NEF can determine, based on the member information of the user group, that the monitoring event reports for all the members in the user group are received, and can further delete the monitoring event configuration for the user group or stop sending the monitoring event report to the SCS/AS, thereby avoiding a resource waste and helping ensure correct execution of a subsequent policy.

Figure 8:
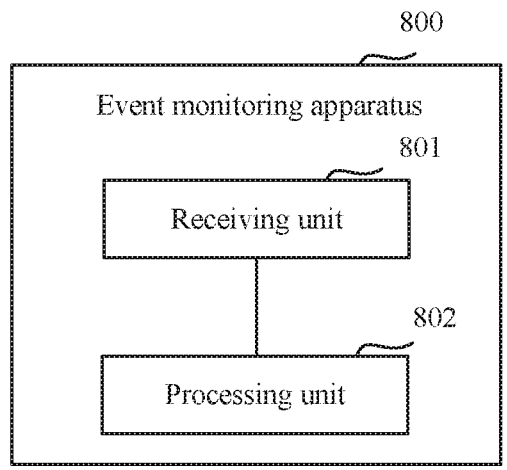
FIG. 8 is a schematic structural diagram 1 of an event monitoring apparatus according to an embodiment of this application.

Based on the event monitoring methods provided in the foregoing embodiments, as shown in FIG. 8, an embodiment of this application further provides an event monitoring apparatus 800. The event monitoring apparatus 800 includes a receiving unit 801 and a processing unit 802.

The event monitoring apparatus 800 is configured to perform steps performed by the exposure function entity in the event monitoring methods provided in the foregoing embodiments. Details are as follows:

The receiving unit 801 is configured to receive a first message, where the first message is used to configure a monitoring event for a user group.

The processing unit 802 is configured to: obtain member information of the user group, determine, based on the member information, that monitoring event reports for all members in the user group are received, and delete a monitoring event configuration for the user group; or is configured to obtain member information of the user group, and determine, based on the member information, whether monitoring event reports for all members in the user group are completed.

The receiving unit 801 and the processing unit 802 in the event monitoring apparatus 800 may be further configured to perform other steps corresponding to the exposure function entity in the event monitoring methods provided in the foregoing embodiments. Repeated parts are not described herein again.

The event monitoring apparatus 800 is further configured to perform steps performed by the user data management entity in the event monitoring methods provided in the foregoing embodiments. Details are as follows: receiving a first request message, where the first request message is used to configure a monitoring event for a user group; and sending a first response message to an exposure function entity, where the first response message carries member information of the user group.

The receiving unit 801 and the processing unit 802 in the event monitoring apparatus 800 may be further configured to perform other steps corresponding to the user data management entity in the event monitoring methods provided in the foregoing embodiments. Repeated parts are not described herein again.

The event monitoring apparatus 800 is further configured to perform steps performed by the third-party application entity in the event monitoring methods provided in the foregoing embodiments. Details are as follows: sending a first message to an exposure function entity, where the first message is used to configure a monitoring event for a user group, and the first message carries member information of the user group.

The receiving unit 801 and the processing unit 802 in the event monitoring apparatus 800 may be further configured to perform other steps corresponding to the third-party application entity in the event monitoring methods provided in the foregoing embodiments. Repeated parts are not described herein again.

Figure 9:
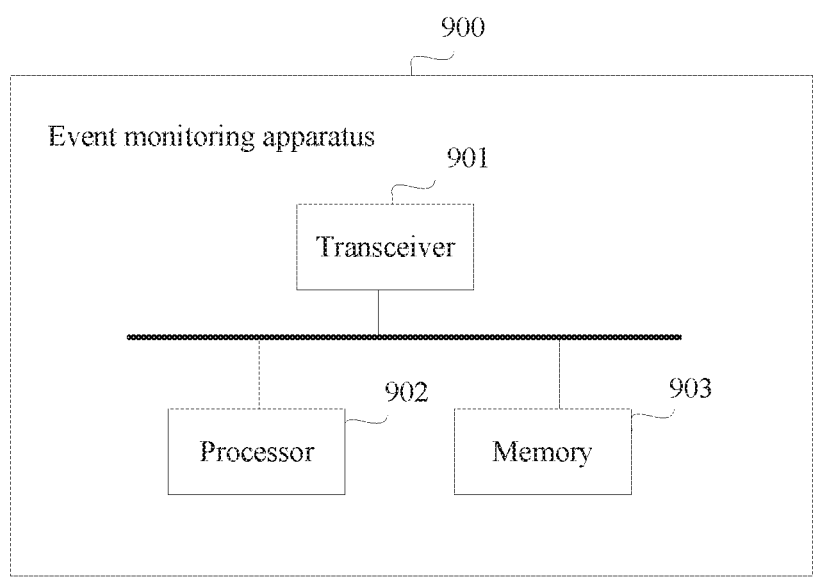
FIG. 9 is a schematic structural diagram 2 of an event monitoring apparatus according to an embodiment of this application.

Based on the event monitoring methods provided in the foregoing embodiments, as shown in FIG. 9, an embodiment of this application further provides an event monitoring apparatus 900. The event monitoring apparatus 900 is configured to perform the foregoing event monitoring methods. The event monitoring apparatus 900 includes a transceiver 901, a processor 902, and a memory 903. The memory 903 is optional. The processor 902 is configured to invoke a group of programs. When the programs are executed, the processor 902 performs the foregoing event monitoring methods. The memory 903 is configured to store the programs executed by the processor 902. In the function modules in FIG. 8, the receiving unit 801 may be implemented by using the transceiver 901, and the processing unit 802 may be implemented by using the processor 902.

The processor 902 may be a central processing unit (CPU), a network processor (NP), or a combination of a CPU and an NP.

The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 903 may include a volatile memory, such as a random-access memory (RAM); or the memory 903 may include a non-volatile memory, such as a flash memory, a hard disk drive (HDD), or a solid-state drive (SSD); or the memory 903 may include a combination of the foregoing types of memories.

To implement a function of the apparatus described in FIG. 8 or FIG. 9, an embodiment of this application further provides a chip, including a processor, configured to support the apparatus in implementing a function related to the exposure function entity, the user data management entity, or the third-party application entity in the foregoing event monitoring methods. In a possible design, the chip is connected to a memory or the chip includes a memory, and the memory is configured to store a program instruction and data that are necessary to the apparatus.

An embodiment of this application provides a computer storage medium that stores a computer program, and the computer program is used to perform the foregoing event monitoring methods.

An embodiment of this application provides a computer program product including an instruction. When the computer program product runs on a computer, the computer is enabled to perform the foregoing event monitoring methods.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A communications method, comprising:
receiving, by an exposure function apparatus, a first message for configuring an event for a user group that comprises a plurality of members;
obtaining, by the exposure function apparatus, member information of the user group, wherein the member information of the user group comprises: a quantity N of the plurality members in the user group, wherein N is a positive integer;
determining, by the exposure function apparatus based on the member information, whether reports of the event for all of the plurality of members in the user group are received; and
in response to determining that the reports for all of the plurality of members in the user group are received, deleting, by the exposure function apparatus, an event configuration of the event for the user group.

2. The method according to claim 1, wherein obtaining the member information of the user group comprises:
obtaining the member information of the user group from a user data management apparatus.

3. The method according to claim 1, wherein the first message is a one-time request for the user group, and wherein determining that the reports of the event for all of the plurality of members in the user group are received comprises:
in response to receiving reports of the event for N members of the user group, determining, by the exposure function apparatus, that the reports for all of the plurality of members are received.

4. The method according to claim 1, wherein the first message comprises a maximum quantity of reports, and wherein determining that the reports for all of the plurality of members in the user group are received comprises:
in response to the maximum quantity of reports being reached for each of N members of the user group, determining that the reports for all of the plurality of members are received.

5. The method according to claim 1, wherein deleting, by the exposure function apparatus, an event configuration of the event for the user group comprises:
sending, by the exposure function apparatus, a second message to a user data management apparatus to instruct the user data management apparatus to delete the event configuration for the user group.

6. An apparatus, comprising:
a non-transitory memory; and
at least one processor coupled with the non-transitory memory, wherein the non-transitory memory stores programming instructions for execution by the at least one processor, the programming instructions instruct the at least one processor to:
receive a first message for configuring an event for a user group that comprises a plurality of members;
obtain member information of the user group, wherein the member information of the user group comprises: a quantity N of the plurality members in the user group, wherein N is a positive integer;
determine, based on the member information, whether reports of the event for all of the plurality of members in the user group are received; and
in response to determining that the reports for all of the plurality of members in the user group are received, delete an event configuration of the event for the user group.

7. The apparatus according to claim 6, wherein obtaining the member information of the user group comprises:
obtaining the member information of the user group from a user data management apparatus.

8. The apparatus according to claim 6, wherein the first message is a one-time request for the user group, and wherein determining that the reports of the event for all of the plurality of members in the user group are received comprises:
in response to receiving reports of the event for N members of the user group
determining that the reports for all of the plurality of members are received.

9. The apparatus according to claim 6, wherein deleting an event configuration of the event for the user group comprises:
sending a second message to a user data management apparatus to instruct the user data management apparatus to delete the event configuration for the user group.

10. The apparatus according to claim 6, wherein the first message comprises a maximum quantity of reports, and wherein determining that the reports of the event for all of the plurality of members in the user group are received comprises:
in response to the maximum quantity of reports being reached for each of N members of the user group, determining that the reports for all of the plurality of members are received.

11. The apparatus according to claim 6, wherein the apparatus is an exposure function apparatus.

12. A communication system, comprising:
an exposure function apparatus, and a user data management apparatus,
wherein the exposure function apparatus is configured to:
receive a first message for configuring an event for a user group that comprises a plurality of members;
obtain member information of the user group from a user data management apparatus, wherein the member information of the user group comprises: a quantity N of the plurality members in the user group, wherein N is a positive integer;
determine, based on the member information, whether reports of the event for all of the plurality of members in the user group are received; and
in response to determining that the reports for all of the plurality of members in the user group are received, delete an event configuration of the event for the user group; and
wherein the user data management apparatus is configured to:
send the member information of the user group to the exposure function apparatus.

13. The system according to claim 12, wherein the first message is a one-time request for the user group, and wherein determining that the reports of the event for all of the plurality of members in the user group are received comprises:
in response to receiving reports of the event for N members of the user group,
determining that the reports for all of the plurality of members are received.

14. The system according to claim 12, wherein the first message comprises a maximum quantity of reports, and wherein determining the reports for all of the plurality of members in the user group are received comprises:

in response to the maximum quantity of reports being reached for each of N members of the user group, determining that the reports for all of the plurality of members are received.

15. The system according to claim 12, wherein that the exposure function apparatus is configured to delete an event configuration of the event for the user group comprises: the exposure function apparatus is configured to send a second message to the user data management apparatus to instruct the user data management apparatus to delete the event configuration for the user group; and
wherein the user data management apparatus is further configured to:
receive the second message from the exposure function apparatus; and delete the event configuration for the user group in response to the second message.

16. The system according to claim 12, further comprising:
a service capability server or an application server configured to: send the first message to the exposure function apparatus.

17. The system according to claim 12, wherein the user data management apparatus is further configured to: receive a first request message for configuring the event for the user group; and
wherein the sending the member information of the user group to the exposure function apparatus comprises: sending a first response message carrying the member information of the user group to the exposure function entity.

18. A communications method, comprising:
receiving, by an exposure function apparatus, a first message for configuring an event for a user group that comprises a plurality of members;
sending, by the exposure function apparatus, a first request message to a user data management apparatus for configuring the event for the user group;
receiving, by the user data management apparatus, the first request message;
sending, by the user data management apparatus, a first response message carrying member information of the user group to the exposure function entity, wherein the member information of the user group comprises: a quantity N of the plurality members in the user group, wherein N is a positive integer;
determining, by the exposure function apparatus based on the member information, whether reports of the event for all of the plurality of members in the user group are received; and
in response to determining that the reports for all of the plurality of members in the user group are received, deleting, by the exposure function apparatus, an event configuration of the event for the user group.

19. The method according to claim 18, wherein deleting, by the exposure function apparatus, the event configuration of the event for the user group comprises:
sending, by the exposure function apparatus a second message to the user data management apparatus to instruct the user data management apparatus to delete the event configuration for the user group; and
wherein the method further comprises:
receiving, by the user data management apparatus, the second message from the exposure function apparatus; and
in response to the second message, deleting, by the user data management apparatus, the event configuration for the user group.

20. The method according to claim 18, wherein the first message is a one-time request for the user group, and wherein determining that the reports of the event for all of the plurality of members in the user group are received comprises:
in response to receiving reports of the event for N members of the user group, determining, by the exposure function apparatus, that the reports for all of the plurality of members are received.

21. The method according to claim 18, wherein the first message comprises a maximum quantity of reports, and wherein determining that the reports for all of the plurality of members in the user group are received comprises: in response to the maximum quantity of reports being reached for each of N members of the user group, determining that the reports for all of the plurality of members are received.

22. The method according to claim 18, further comprising:
sending, by a service capability server or an application server, the first message to the exposure function apparatus.

* * * * *

UNITED STATES PATENT AND TRADEMARK OFFICE
CERTIFICATE OF CORRECTION

PATENT NO. : 11,425,538 B2
APPLICATION NO. : 17/066914
DATED : August 23, 2022
INVENTOR(S) : Fenqin Zhu Page 1 of 1

It is certified that error appears in the above-identified patent and that said Letters Patent is hereby corrected as shown below:

In the Claims

In Column 35, In Line 9, In Claim 1, after "plurality" insert -- of --.

In Column 35, In Line 59, In Claim 6, after "plurality" insert -- of --.

In Column 36, In Line 42, In Claim 12, after "plurality" insert -- of --.

In Column 37, In Line 43, In Claim 18, after "plurality" insert -- of --.

Signed and Sealed this
Twenty-fifth Day of April, 2023

Katherine Kelly Vidal
*Director of the United States Patent and Trademark Office*